US 012255909B2

(12) United States Patent
Sethi et al.

(10) Patent No.: US 12,255,909 B2
(45) Date of Patent: Mar. 18, 2025

(54) METHOD AND SYSTEM FOR MONITORING HEALTH AND SECURITY OF DATA CENTER COMPONENTS VIA BI-DIRECTIONAL PROXY

(71) Applicant: Dell Products L.P., Round Rock, TX (US)

(72) Inventors: Parminder Singh Sethi, Ludhiana (IN); Anay Kishore, Bangalore (IN); Nithish Kn, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 273 days.

(21) Appl. No.: 18/174,001

(22) Filed: Feb. 24, 2023

(65) Prior Publication Data

US 2024/0291835 A1 Aug. 29, 2024

(51) Int. Cl.
*H04L 29/06* (2006.01)
*H04L 9/40* (2022.01)

(52) U.S. Cl.
CPC ...... *H04L 63/1425* (2013.01); *H04L 63/0236* (2013.01); *H04L 63/20* (2013.01)

(58) Field of Classification Search
CPC .. H04L 63/1425; H04L 63/0236; H04L 63/20
See application file for complete search history.

(56) References Cited

U.S. PATENT DOCUMENTS

| 7,590,981 | B2 | 9/2009 | Gupta et al. |
| 8,078,448 | B1 | 12/2011 | Wohlberg et al. |
| 10,771,489 | B1 * | 9/2020 | Bisht ............ G06N 20/00 |
| 10,944,665 | B1 * | 3/2021 | Singh ............ H04L 12/4641 |
| 2010/0142447 | A1 | 6/2010 | Schlicht |
| 2011/0113224 | A1 | 5/2011 | Isshiki et al. |
| 2015/0278219 | A1 | 10/2015 | Phipps |
| 2016/0162280 | A1 | 6/2016 | Murayama et al. |
| 2018/0004942 | A1 * | 1/2018 | Martin ............ G06F 21/554 |
| 2018/0113728 | A1 | 4/2018 | Musani et al. |

(Continued)

OTHER PUBLICATIONS

Achmadi, Dedy, Yohan Suryanto, and Kalamullah Ramli. "On developing information security management system (isms) framework for iso 27001-based data center." 2018 International Workshop on Big Data and Information Security (IWBIS). IEEE, 2018. (Year: 2018).*

*Primary Examiner* — Ka Shan Choy
(74) *Attorney, Agent, or Firm* — Aly Z. Dossa; Chamberlain, Hrdlicka, White, Williams & Aughtry

(57) ABSTRACT

A method for managing a data center includes: receiving metadata associated with a data center component (DCC); making a first determination that the DCC is valid; analyzing, based on the first determination, the metadata to extract relevant data; obtaining a current state of the DCC based on the relevant data; inferring a future state of the DCC based on the current state of the DCC; obtaining a confidence score of the future state of the DCC based on the relevant data; making a second determination that the confidence score exceeds a predetermined maximum confidence score; generating, based on the second determination, a failure report associated with the DCC, wherein the report comprises at least the current state of the DCC and future state of the DCC; and providing the failure report to a vendor of the DCC to notify an administrator of the vendor.

20 Claims, 8 Drawing Sheets

(56) References Cited

U.S. PATENT DOCUMENTS

2019/0081959 A1\* 3/2019 Yadav ..................... H04L 63/02
2020/0156243 A1 5/2020 Ghare et al.
2020/0351900 A1 11/2020 Zhang
2022/0385683 A1\* 12/2022 Jones ................. H04L 63/1441

\* cited by examiner

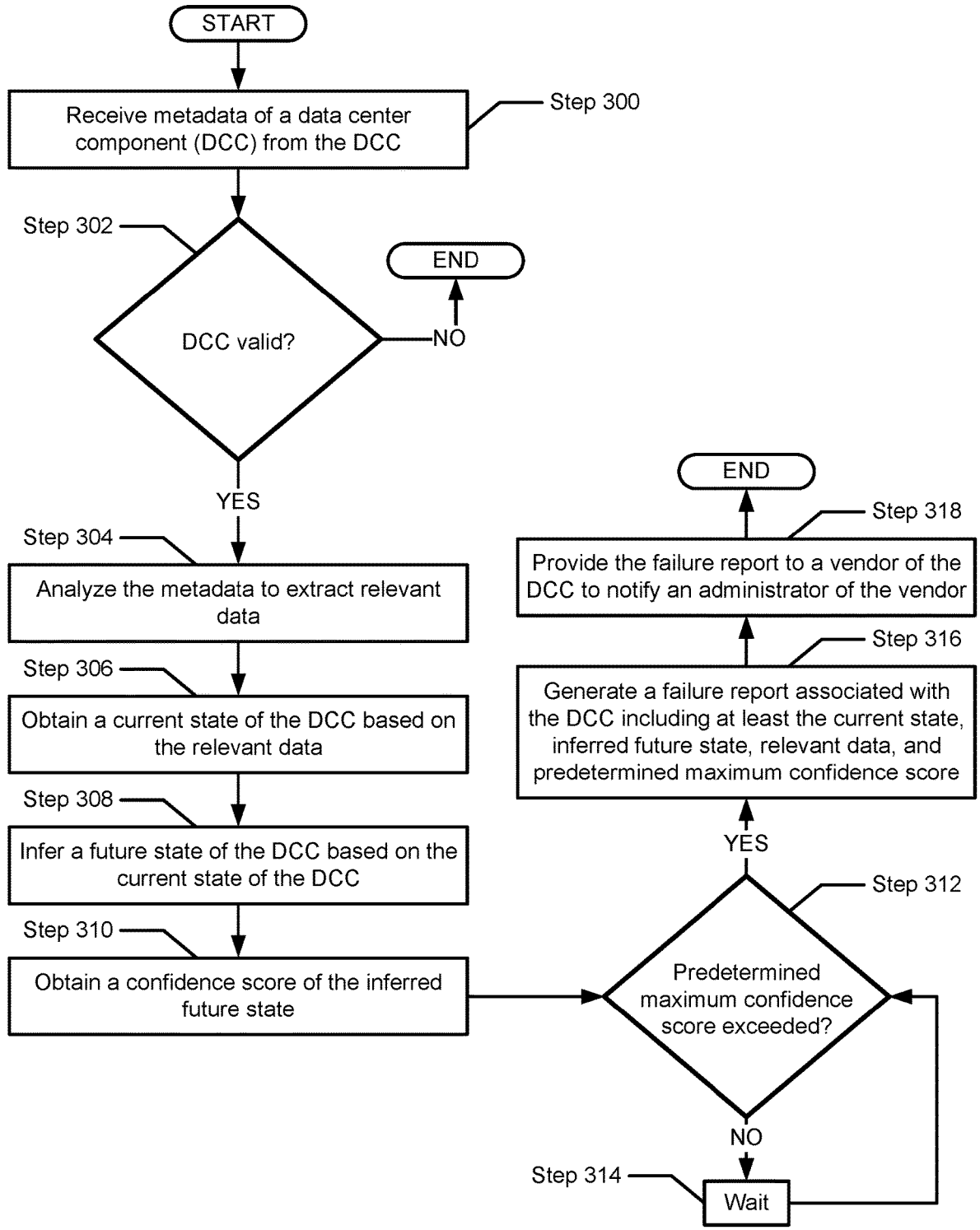
FIG. 3.1

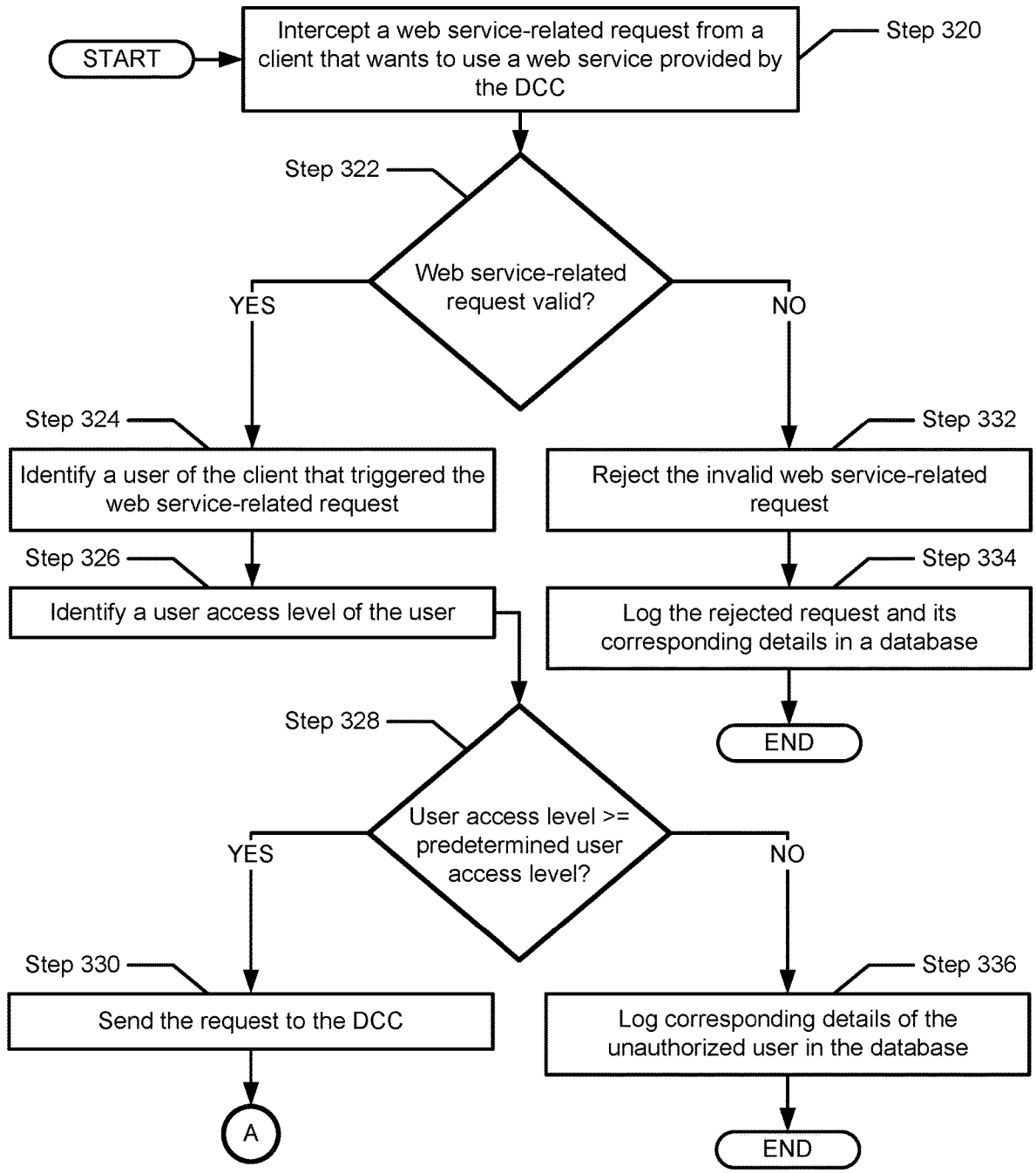
FIG. 3.2

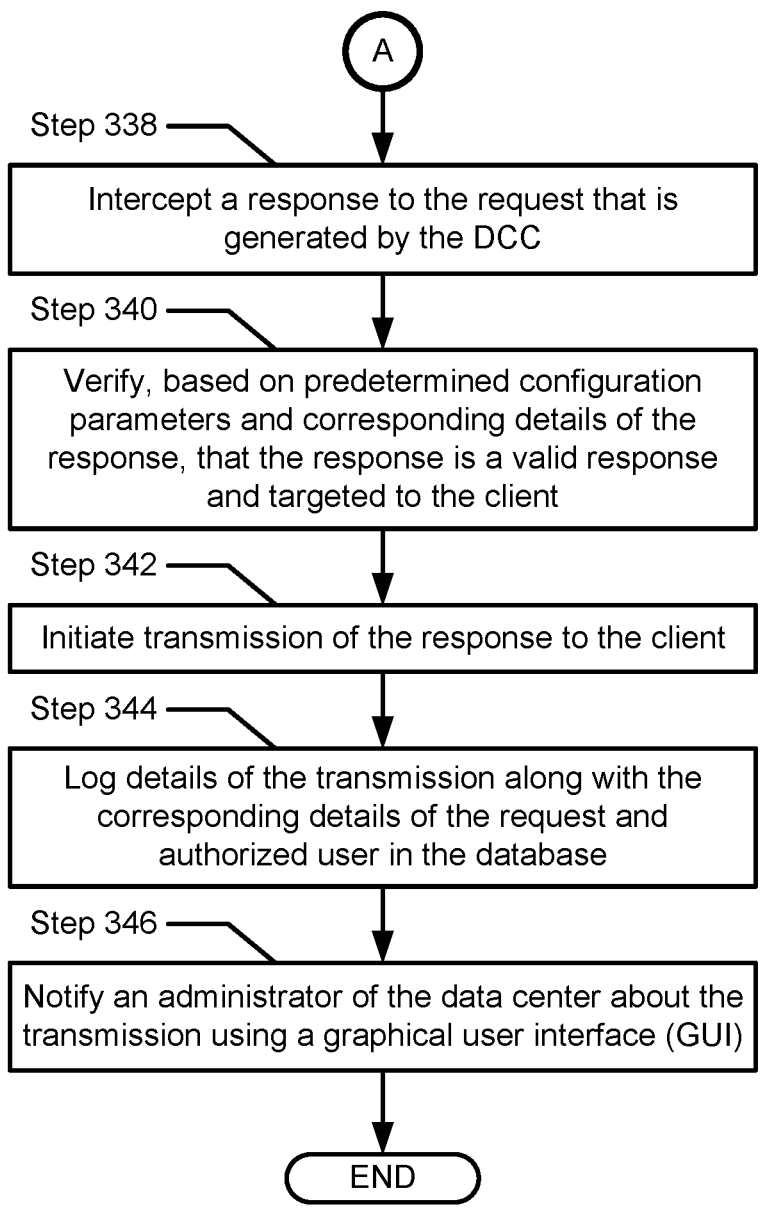
FIG. 3.3

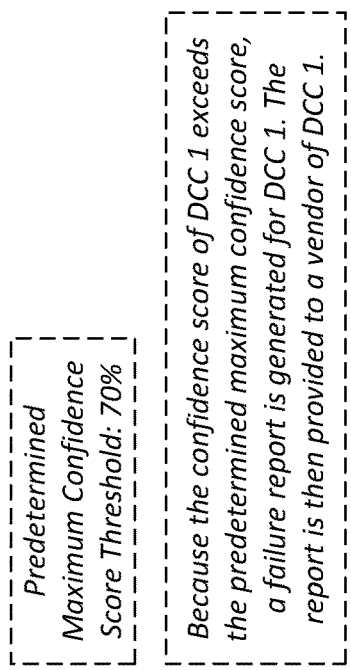
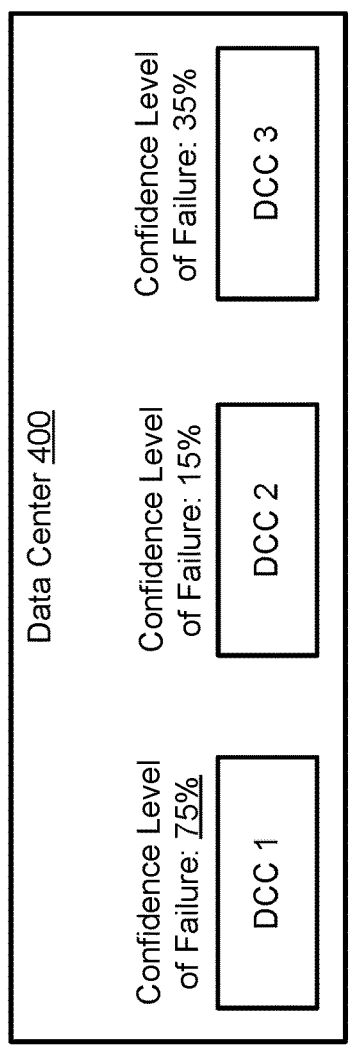
FIG. 4.1
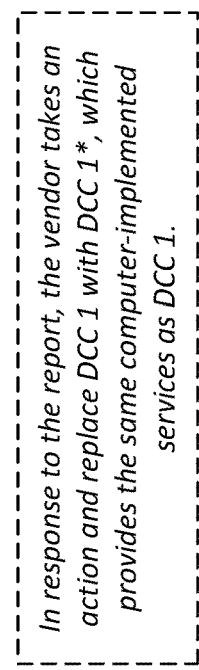
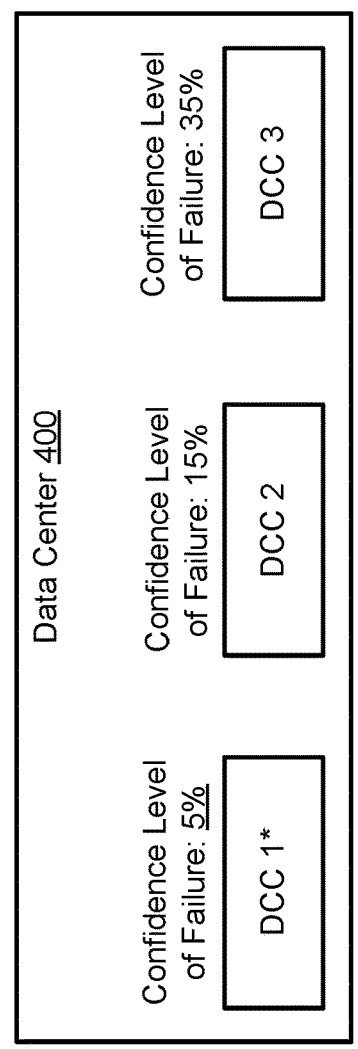
FIG. 4.2

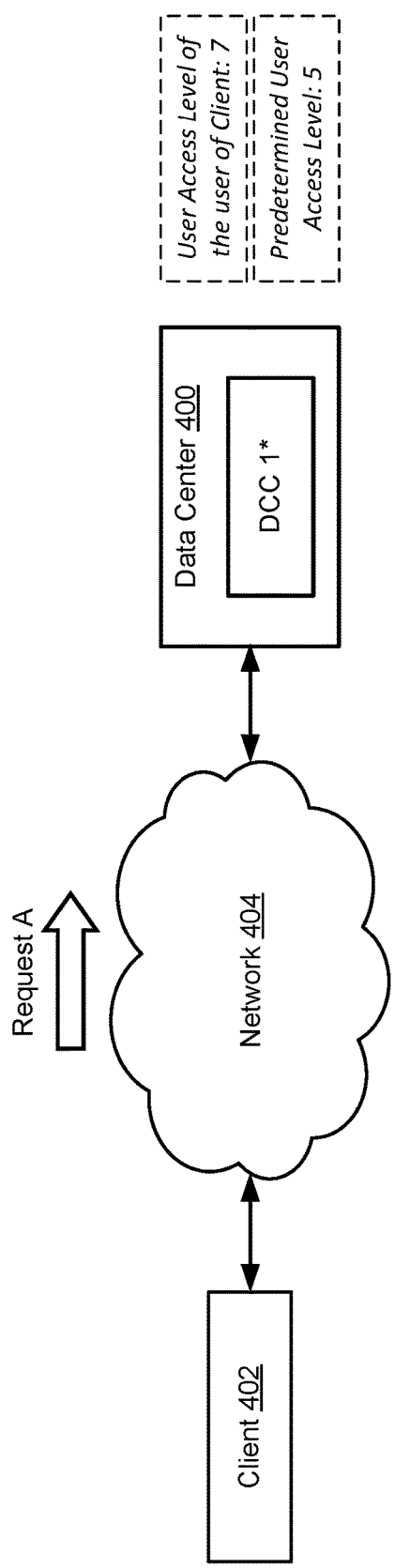
FIG. 4.3
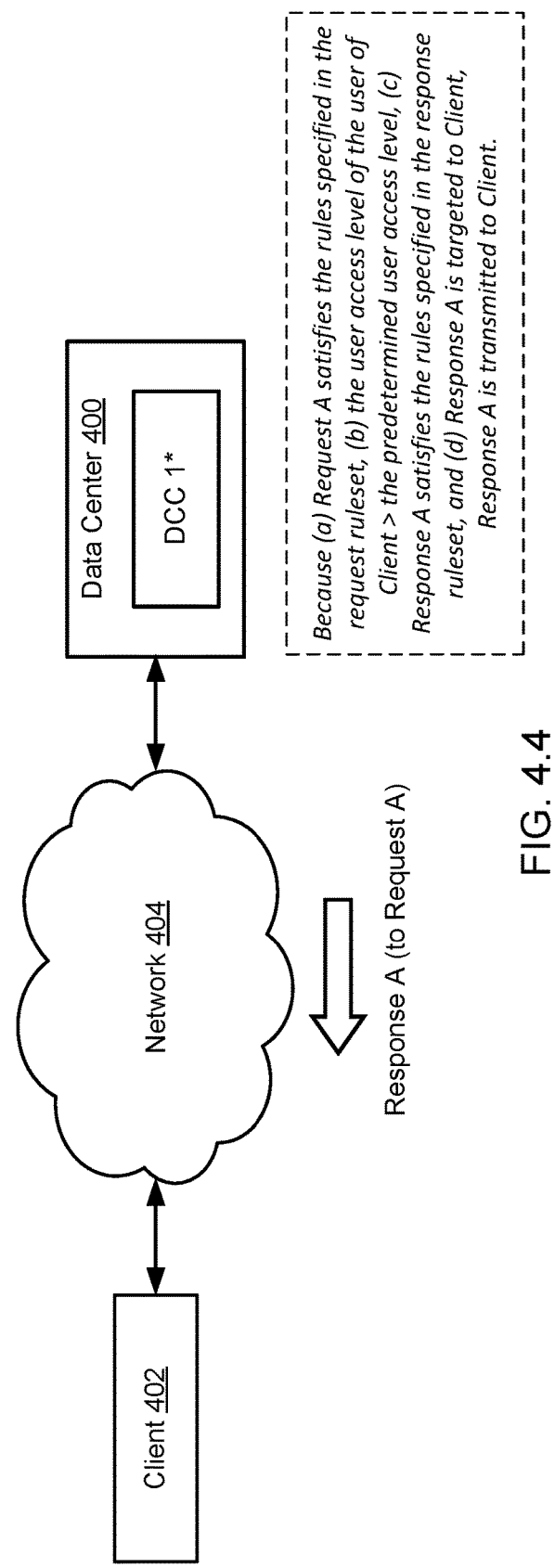
FIG. 4.4

METHOD AND SYSTEM FOR MONITORING HEALTH AND SECURITY OF DATA CENTER COMPONENTS VIA BI-DIRECTIONAL PROXY

BACKGROUND

Computing devices may provide services. To provide the services, the computing devices may include hardware components and software components. The software components may store information usable to provide the services using the hardware components.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for monitoring health and security of data center components in accordance with one or more embodiments of the invention.

FIGS. 4.1-4.4 show an example use case in accordance with one or more embodiments of the invention.

DETAILED DESCRIPTION

Figure 1:
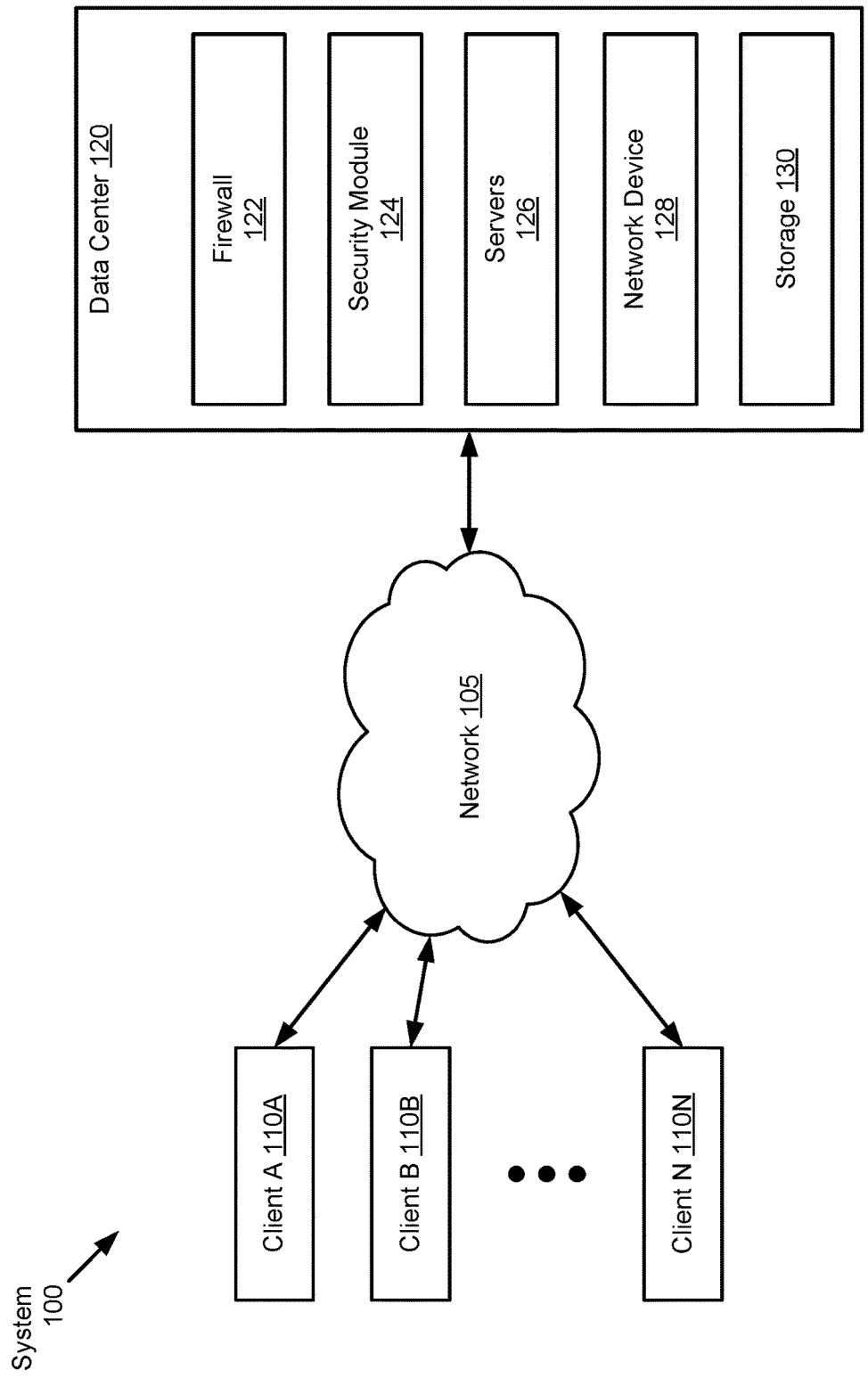
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, data centers are known as computing environments including various different hardware and software components. As corporates (e.g., organizations) reaching different geographical regions of the world with their diversified business models, and because of the increased demand for data availability, integrity, and reliability, (i) the hardware components (e.g., data center components (DCCs) such as servers, switches, gateways, storage devices, networking devices, etc.) act as underlying components to enable solid data (e.g., business operation information or simply "information") management among multiple data centers (of those organizations) around the world, and (ii) the need for diversifying those data centers and applications executing on them arises.

With the growing business needs of organizations, conducting successful business operations among geographically distributed data centers becomes a priority. In particular, (i) keeping information always available (and ready to flow), (ii) keeping data centers (and their components (i.e., DCCs)) always available (e.g., healthy to provide their computer-implemented services), and (iii) managing data centers with respect to information integrity and flow, application reliability, and hardware component reliability are becoming increasingly important and challenging.

In most cases, DCCs of a data center (and services provided by those DCCs) may fail (i) because of security and/or natural calamity related issues and (ii) lack of predictive analysis. For example, DCCs of a data center may be a direct target for a denial-of-service (DDOS) attack if those components are exposed to the Internet with a single layer security (e.g., with a single firewall). As yet another example, if a hacker (e.g., a malicious entity) gains a virtual or physical access to a data center (more specifically, to DCCs of that data center), the hacker may easily download malware (and/or ransomware) that could negatively affect production workloads (e.g., read data, write data, etc.) performed by the DCCs. As yet another example, there could be a certain type of undetected hardware failure in a data center, which could negatively affect production workloads performed by DCCs of that data center. In order to prevent at least the aforementioned issues and to have a data center with maximum uptime (e.g., maximum availability), DCCs of that data center (and services provided by those DCCs) (i) may need to be continuously monitored and (ii) the level of security of those components may need to be maintained at a predetermined security level.

Embodiments of the invention relate to methods and systems (i) to provide an integrated security and analysis layer towards providing a data center with maximum uptime, (ii) to continuously monitor DCCs of a data center (and services provided by those DCCs), and (iii) to take one or more preventive (and proactive) actions. More specifically, the embodiments of the invention may first receive metadata associated with a DCC. In response to receiving the metadata, a first determination may be made that the DCC is valid. Based on the first determination, the metadata may be analyzed to extract relevant data. Thereafter, based on the relevant data, a confidence score of a future state of the DCC may be obtained. A second determination may be made that the confidence score exceeds a predetermined maximum confidence score, in which the second determination indicates that the DCC is unhealthy. Based on the second determination, a notification from a vendor of the DCC may be received, in which the notification indicates that health of the DCC has been managed.

Further, upon receiving the notification and after intercepting a request from a client, a third determination may be made that the request is valid. Based on the third determination, a fourth determination may be made that a user access level of a user of the client is greater than a predetermined user access level. Thereafter, based on the fourth determination, the request may be sent to the DCC. After intercepting a response to the request, the response may be verified because (i) the response satisfies an attribution rule specified in a configuration parameter and (ii) the response is targeted to the client. Based on the verification, transmission of the response to the client may be initiated. Finally, a second user of the data center may be notified about the transmission using the data center's graphical user interface.

As a result of the processes discussed below, one or more embodiments disclosed herein advantageously ensure that: (i) data integrity, availability, and reliability (among all data centers of an organization) are being kept at the maximum level (with almost zero downtime on operations and/or interruption in services) so that computer-implemented services provided by DCCs are always available, (ii) risks/threats (which are higher during data transmission and input validation(s)) that are posed to (a) DCCs, (b) services provided by those DCCs, and (c) all related logical components of the corresponding data center are prevented, (iii) a data retrieval/transfer operation (e.g., flow of data over a network) will not be initiated unless and until the corresponding security module (described below) validates the associated incoming request/call/network traffic (e.g., a data retrieval request, a data transfer request, etc.), authenticates the sender (e.g., a user, an external customer, a malicious actor, a developer, an administrator, an employee of an organization, etc.) of that request, and validates the target direction/destination of the operation, (iv) any possible latency is being kept at the minimum level to provide (a) an efficient and reliable, for example, data retrieval operation and/or data transfer operation, and (b) a better user experience to one or more users of geographically distributed data centers (for example, of the same organization), (v) all hardware and/or software component failures are handled proactively (by obtaining (or receiving) corresponding metadata (described below) from each DCC, and employing one or more predictive analyses on them), (vi) technical support entities (e.g., vendors) easily identify reason(s) of a hardware or software component failure and take an appropriate action, and (vii) efficiency of performing production workloads on each data center kept at the maximum level.

The following describes various embodiments of the invention.

FIG. 1 shows a diagram of a system (100) in accordance with one or more embodiments of the invention. The system (100) includes one or more clients (e.g., Client A (110A), Client B (110B), etc.), a data center (120), and a network (105). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (e.g., 110A, 110B, etc.), the data center (120), and the network (105) may be physical or logical devices, as discussed below. Each client (e.g., 110A) may be operably connected to data center (120) via the network (105), in which the network (105) may allow each client (and its hardware and software components) to communicate with the data center (120) (e.g., to communicate with DCCs of the data center (120)). In one or more embodiments, a firewall (122), a security module (124), one or more servers (126), a network device (128), and storage (130) that are deployed to the data center (120) may collectively be referred to as "DCCs of the data center (120)".

While FIG. 1 shows a specific configuration of the system (100), other configurations may be used without departing from the scope of the invention. For example, although Client A (110A) and the data center (120) are shown to be operatively connected through the network (105), Client A (110A) and the data center (120) may be directly connected, without an intervening network (e.g., 105). As yet another example, although Client B (110B) and the data center (120) are shown to be operatively connected through the network (105), Client B (110B) and the data center (120) may be directly connected, without an intervening network (e.g., 105).

Further, the functioning of the clients (e.g., 110A, 110B, etc.) and the data center (120) is not dependent upon the functioning and/or existence of the other components (e.g., devices) in the system (100). Rather, the clients (e.g., 110A, 110B, etc.) and the data center (120) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. Further, as used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may deliver computing power, storage capacity, and data protection (e.g., software-defined data protection) as a service to users of the clients (e.g., 110A, 110B, etc.). The system (100) may also represent a comprehensive middleware layer executing on computing devices (e.g., 500, FIG. 5) that supports virtualized application environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, as being a physical computing device or a logical computing device (e.g., a VM), the data center (120) may be configured for hosting and maintaining various workloads, and/or for providing a computing environment (e.g., computing power and storage) whereon workloads may be implemented. In general, a data center's (e.g., a site's, a node's, etc.) infrastructure is based on a network of computing and storage resources that enable the delivery of shared applications and data. For example, the data center (120) of an organization may exchange data with other data centers of the same organization registered in/to the network (105) in order to, for example, participate in a collaborative workload placement. As yet another example, the data center (120) may split up a request (e.g., an operation, a task, an activity, etc.) with another data center, coordinating its efforts to complete the request (e.g., to generate a response) more efficiently than if the data center (120) had been responsible for completing the request. One of ordinary skill will appreciate that the data center (120) may perform other functionalities without departing from the scope of the invention.

In one or more embodiments, the data center (120) may be capable of providing the aforementioned functionalities/services to the user of the clients (e.g., 110A, 110B, etc.). However, not all of the users may be allowed to receive all of the services. For example, the priority (e.g., the user access level) of a user may be used to determine how to manage computing resources within the data center (120) to provide services to that user. As yet another example, the priority of a user may be used to identify the services that need to be provide to that user. As yet another example, the priority of a user may be used to determine how quickly communications (for the purposes of providing services in cooperation with the network (105) (and its subcomponents)) are to be processed by the network (105).

Further, consider a scenario where a first user is to be treated as a normal user (e.g., a user with a user access level of 4/10). In such a scenario, the user level of that user may indicate that certain ports (of the subcomponents of the network (105)) are to be opened, other ports are to be blocked so that (i) certain services are to be provided to the user by the data center (120) and (ii) network traffic from that user is to be afforded a normal level of quality (e.g., a normal processing rate). In contrast, a second user may be determined to be a high priority user (e.g., a user with a user access level of 9/10). In such a case, the user level of that user may indicate that more ports are to be opened than were for the first user so that (i) the data center (120) may provide more services to the second user and (ii) network traffic from that user is to be afforded a high level of quality (e.g., a higher processing rate than the traffic from the normal user).

As used herein, "network traffic" is an amount of data moving across a network (e.g., 105) at any given time. For example, in search engine optimization, network traffic may be characterized as being either direct, organic, or paid, in which (i) direct network traffic may be initiated when a user types a website's uniform resource locator (URL) in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

As yet another example, in data center administration, network traffic may be characterized as either being north-south or east-west, in which (i) north-south network traffic may be client-to-server network traffic that operates between a client and a server and (ii) east-west network traffic may be server-to-server network traffic that operates between servers within a data center.

In one or more embodiments, the data center (120) may include, for example (but not limited to): a router, a switch, a firewall, a security module, storage, a server, an application-delivery controller, a network device, etc. The data center (120) may support business application and activities (e.g., actions, behaviors, etc.) that include, for example (but not limited to): email and asset (e.g., a file, a folder, etc.) sharing, one or more production workloads, customer relationship management, enterprise resource planning, artificial intelligence (AI)/machine learning (ML)-based activities, virtual desktop infrastructure (VDI) environments, collaboration services, etc.

In one or more embodiments, the DCCs (described above) provide, at least, (i) network infrastructure (which connects servers (physical and/or virtualized), data center services, storage, and external connectivity to end-user locations (e.g., 110A, 110B, etc.)), (ii) storage infrastructure (e.g., the storage (130)), and (iii) computing resources (e.g., processing, memory, local storage, network connectivity, etc.) that drive applications.

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer (e.g., to determine) SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

In one or more embodiments, the wrong (or sub-optimal) selection of a target device may (i) result in generating an over-utilized or under-utilized target device and (ii) unnecessarily delay a backup (or replication) operation window.

As used herein, the term "backup" is intended to be broad in scope. In this manner, example backups in connection with which embodiments of the invention may be employed include (but not limited to): full backups, partial backups, clones, replications, snapshots, incremental backups, differential backups, etc.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

Further, comparing to a conventional data center scenario, in which (i) all the necessary hardware and software components are needed to be acquired and (ii) an entire infrastructure team is needed to build and configure all aspects of the infrastructure (which may take weeks), the above process may take only minutes with containers. Containers may also include functionality to: (i) perform disaster recovery (with this functionality, even if multiple containers fail, applications may continue to execute uninterrupted), (ii) perform seamless scaling up and down with little to no intervention on the part of a user (with this functionality, as demand grows, containers may eliminate the need to add more servers or allocate more resources in a costly way), and (iii) reduce labor-intensive efforts and costs, in which containers may require very few personnel to manage and monitor applications and instances. One of ordinary skill will appreciate that containers may perform other functionalities without departing from the scope of the invention.

As used herein, a "file system" is a method that an OS (e.g., Microsoft® Windows, Apple® MacOS, etc.) uses to control how data is named, stored, and retrieved. For example, once a user has logged into a computing device (e.g., 500, FIG. 5), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "cloud" refers to servers that are accessed over the Internet (and the software and databases that executes on those servers). With the help of cloud (or "cloud computing"), users or organizations do not need to manage physical servers themselves or execute software applications on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it was a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, cloud computing environments (which may or may not be public) may include storage environments that may provide data protection functionality for one or more users. Cloud computing environments may also perform computer-implemented services (e.g., data protection, data processing, etc.) on behalf of one or more users. Some example cloud computing environments that embodiments of the invention may be employed include (but not limited to): Microsoft® Azure, Amazon® AWS, Dell® Cloud Storage Services, Google® Cloud, etc.

In one or more embodiments, the data center (120) may be a part of a business operation region (BOR) (not shown) of an organization, in which the BOR corresponds to a geographic region (e.g., a city, a county, a state, a province, a country, a country grouping (e.g., the European Union), etc.). For example, the data center (120) of Organization X may be located in the United States and another data center of Organization X may be located in the Netherlands, in which Organization X has multiple geographically distributed data centers around the world.

In one architecture (e.g., the "unidirectional" architecture), one of the data centers (e.g., the parent data center) of an organization may be deployed to the United States, which serves (e.g., shares) data to/among the remaining data centers (e.g., the child data centers that are deployed to Argentina, India, and France) of the organization. In this architecture, the child data centers may transmit their data to the parent data center so that the parent data center is always updated. Thereafter, the parent data center may distribute/forward received data to the child data centers to keep the child data centers equally updated.

In another architecture (e.g., the "bidirectional" architecture), one of the data centers of an organization may be deployed to Greece and the other one may be deployed to Spain, in which both data centers know each other and when a data change is occurred in one of them, the other data center may automatically obtain that data to stay updated. Further, in another architecture (e.g., the "multidirectional" architecture), an organization may have multiple data centers deployed around the world and all of the data centers know each other. When one of the data centers is updated (e.g., when that data centers receives a software package), the remaining data centers are updated accordingly (e.g., by sending a data transfer request to each of the remaining data centers).

Figure 5:
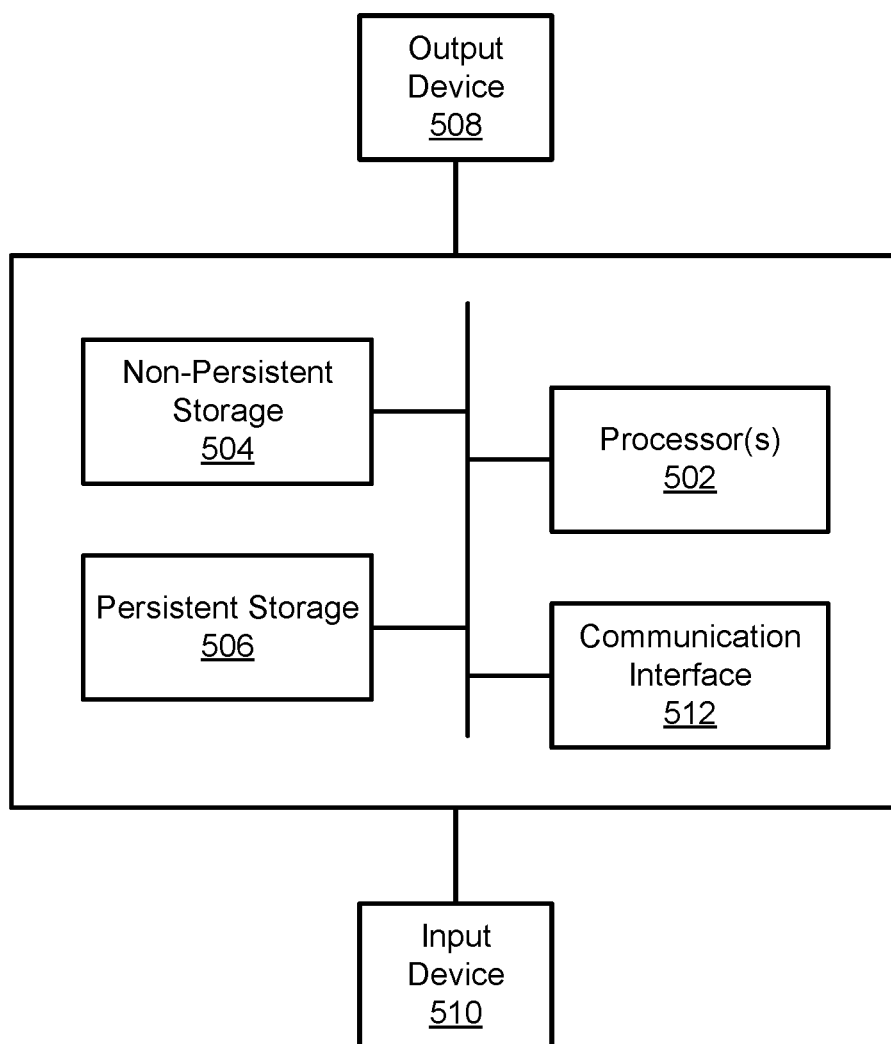
FIG. 5 shows a diagram of a computing device in accordance with one or more embodiments of the invention.

In one or more embodiments, the data center (120) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the data center (120) described throughout this application.

Alternatively, in one or more embodiments, the data center (120) may be implemented as a logical device. The logical device may utilize the computing resources of any number of computing devices to provide the functionality of the data center (120) described throughout this application.

In one or more embodiments, as described above, the data center (120) may include the firewall (122), one or more security modules (e.g., 124), the servers (126), the network device (128), and the storage (130).

In one or more embodiments, the firewall (122) is a network monitoring/security component that monitors all incoming and outgoing network traffic (e.g., requests, responses, calls, etc.), in which it decides whether to allow or block specific network traffic based on a defined set of security rules. The firewall (122) may be, for example (but not limited to): a hardware component, a software component, a software as-a-service (SaaS), a private cloud, etc. The aforementioned example is not intended to limit the scope of the invention.

The firewall (122) may include functionality to monitor (e.g., track) network traffic in the network (105) to obtain a dataset. In one or more embodiments, the dataset may include, for example (but not limited to): a request (e.g., an application programming interface (API) call), a type of a request (e.g., a "get" request, a "delete" request, an "update" request, a "post" request, etc.), a response to a request (e.g., a response to an API call), corresponding response time for a request, a list of application data that is being used (e.g., obtained, updated, etc.) by an API (e.g., application data 1 and 2 are being used by API X to change locations of both data in the file system), a list of operations that is being done on application data (e.g., while renaming application data 2, API X encrypted application data 2; after encrypting, API X duplicated and modified application data 2), a usage level (e.g., 50 times in 1 hour, 10 times in 1 minute, etc.) of an application data by an API, a period of time within which application data is being used by an API, etc.

As used herein, an "API call" may refer to a process of an application or a computing device submitting a request to an API (e.g., a component that acts as the "front door" for applications to access data and/or functionality from back-end services) to retrieve the requested data from an external application or an external computing device.

In one or more embodiments, a request and a response to that request may be communicated over the network (105). In one or more embodiments, corresponding response time for a request may be a period of time, with a definite start and end, within which a response process is set to be completed.

In one or more embodiments, the firewall (122) may periodically obtain the dataset from the network traffic. The firewall (122) may also obtain the dataset from the network traffic in real-time. The firewall (122) may then store (temporarily or permanently) the dataset in a storage/memory resource (e.g., the storage (130)) of the data center (120).

In one or more embodiments, the firewall (122) may also monitor the network traffic to determine, for example (but not limited to): availability of the network (105), unusual activities (e.g., exploitation events) on the network (105), etc. In most cases, an unusual activity on the network (105) may be a sign of a security issue (e.g., a malicious attack, distributed DDOS attack, malware attack, etc.). Because of the determined unusual activity, the firewall (122) may notify an administrator (e.g., a network service provider (NSP)) of the network (105). Based on receiving the notification from the firewall (122), the NSP of the network (105) may reconfigure the network (105) to fix the security issue.

In one or more embodiments, because of increased network traffic, the firewall (122) may detect latency (e.g., delay) in the network (105). Because of the latency (e.g., 35 ms latency Quality of Service (QOS) network connection), the firewall (122) may also notify the NSP. Based on receiving the notification from the firewall (122), the NSP may also reconfigure the network (105) to minimize the latency (e.g., the time it takes for data packets to be transmitted, stored, or retrieved).

In one or more embodiments, the firewall (122) may detect latency in the network traffic because of, for example (but not limited to): an increased amount of requests, an increased amount of responses, an increase in a size of a request, an increase in a size of a response, etc. One of ordinary skill will appreciate that the firewall (122) may perform other functionalities without departing from the scope of the invention.

In one or more embodiments, the firewall (122) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the firewall (122) described throughout this application.

Alternatively, in one or more embodiments, similar to the data center (120), the firewall (122) may also be implemented as a logical device.

In one or more embodiments, the network device (128) may be any type of network device (e.g., a switch, a router, etc.) that enables computing devices to communicate with other computing devices in a network environment. The network device (128) may include functionality to, e.g.: (i) use information (e.g., network use information, network configuration information that specify any number of configurations for a network device to provide its functionalities with a high configurability, etc.) included in a provided services repository (not shown) to determine how to provide/configure its respective services (for example, (a) the repository may specify identifiers of services and corresponding ports for the network device (128) and (b) the repository may specify how to configure the network device (128) at any level of granularity), (ii) based on a request received from the security module (124), generating a secure data access path (e.g., a secure tunnel) across the network (105), (iii) perform any number and type of communications schemes (e.g., Internet protocol (IP) communications, Ethernet communications, etc.), (iv) being configured by other computing devices, and (v) limiting communications on a granular level (e.g., on a per port level, on a per sending device level, etc.) via filtering or other methodology.

In one or more embodiments, the provided services repository may be maintained by, for example, the storage (130). The storage (130) may add, remove, and/or modify information included in the provided services repository. The storage (130) may do so based on information or a request/call obtained from administrators, other data structures, and/or from other sources (e.g., the security module (124)). The data structures of the provided services repository may be implemented using, for example, lists, tables, unstructured data, databases, etc. While described as being stored locally, the provided services repository may be stored remotely and may be distributed across any number of devices without departing from the invention.

In one or more embodiments, the network device (128) may provide compression of network traffic at any level of a network stack or at any protocol (or network layer). The network device (128) may also provide transport layer protocol optimizations (e.g., transport control protocol (TCP) optimizations), flow control, performance, modifications and/or management to accelerate delivery of applications and data, for example, (i) over a wide area network (WAN) connection, (ii) for any session, or (iii) for any application layer.

In one or more embodiments, the network device (128) may act as any type and form of transport control protocol or transport layer terminating device, such as a gateway or a firewall. For example, the network device (128) may terminate a transport control protocol by establishing a transport control protocol connection with a second network device (for example, included in Client A (110A)). As yet another example, the network device (128) may terminate a transport control protocol by managing the behavior of the transport control protocol connection between the network device (128) and a second network device (for example, included in Client B (110B)), in which the network device (128) may change, queue, or transmit network packets to effectively terminate the transport control protocol connection.

In one or more embodiments, network devices (e.g., the network device (128) and a second network device) may, at least, (i) provide a secure (e.g., an encrypted) tunnel by employing a tunneling protocol (e.g., the generic routing encapsulation (GRE) tunneling protocol, the IP-in-IP tunneling protocol, the secure shell (SSH) tunneling protocol, the point-to-point tunneling protocol, the virtual extensible local area network (VXLAN) protocol, etc.), (ii) set up efficient and secure connections (e.g., a virtual private network (VPN) connection (or a trust relationship), a secure socket layer VPN (SSL VPN) connection, an IP security (IPSec) based VPN connection, a transport layer security VPN (TLS VPN) connection, etc.) between networks, (iii) enable the usage of unsupported network protocols, (iv) manage access to resources between different networks (with more granular control) and track all the operations and network traffic logins, and (v) in some cases, enable users to bypass firewalls (e.g., provide endpoint-to-endpoint connections across a hybrid network without opening firewall rules in an enterprise network). To this end, the network device (128) may include any logic, functions, rules, or operations to perform services or functionalities (for communications between, for example, the data center (120) and Client A (110A)) such as, for example, SSL VPN connectivity, SSL offloading, switching/load balancing, hypertext transfer protocol secure (HTTPS)-encrypted connections, domain name service (DNS) resolution, and acceleration techniques (e.g., compression (e.g., a context-insensitive compression or context-sensitive compression by employing a delta-type compression model, a lossless compression model, or a lossy compression model), decompression, TCP pooling, TCP multiplexing, TCP buffering, caching, etc.).

As used herein, in networking, "tunneling" is a way for transporting data across a network (e.g., 105) using protocols (standardized set of rules for (i) formatting and processing data, and (ii) enabling computing devices to communicate with one another) that are not supported by that network. In general, a "secure tunnel" refers to a group of microservices that includes, for example (but not limited to): a user interface (UI) server service, an API server service, a controller service, a tunnel connection service, an application mapping service, etc.

Tunneling works by encapsulating packets (packets are small pieces of data that may be re-assembled at their destination into a larger file), in which an "encapsulated packet" is essentially a packet inside another packet. In an encapsulated packet, the header and payload of the first packet goes inside the payload section of the surrounding packet where the original packet itself becomes the payload.

In one or more embodiments, encapsulation may be useful for encrypted network connections ("encryption" refers to the process of scrambling data in such a way that the data may only be unscrambled using a secret encryption key, in which the process of undoing the encryption is called "decryption"). If a packet is completely encrypted (including the header), then network routers will not be able to transport the packet to its destination because they do not have the key and cannot see its header. By wrapping the encrypted packet inside another unencrypted packet, the packet may travel across networks like normal.

In one or more embodiments, network devices (the network device (128) and a second network device) may provide, for example, a TLS VPN connection between the data center (120) and Client B (110B). For example, the security module (124) may request (e.g., initiate) generation (e.g., establishment) of an end-to-end secure tunnel (e.g., a TLS VPN connection) from the data center (120) to Client B (110B) over the network (105). Once the secure tunnel is generated: (i) a network device deployed to Client B (110B) may receive one or more data packets from the storage of Client B, (ii) the network device deployed to Client B (110B) may encrypt the data packets and transmit them to the network device (128) via the secure tunnel, (iii) after receiving the data packets, the network device (128) may decrypt the data packets and transmit them to the security module (124), (iv) if the data packets satisfy one or more attribution rules specified in configuration parameters (described below in reference to FIG. 2), the security module (124) sends them to the storage (130), and (v) the network device (128) and network device deployed to Client B (110B) may then effectively terminates the secure tunnel by managing the behavior of the secure tunnel (e.g., the TCP connection) between the data center (120) and Client B (110B).

In one or more embodiments, the network device (128) may include an encryption/decryption engine (not shown) providing logic, business rules, functions, or operations for handling the processing of any security related protocol (e.g., the SSL protocol, the TLS protocol, etc.) or any function related thereto. For example, the encryption/decryption engine may encrypt and/or decrypt data packets (based on executable instructions running on an encryption/decryption processor), or any portion thereof, communicated via the network device (128). The encryption/decryption engine may also establish secure tunnel connections on behalf of the network device (128). In one or more embodiments, the network device (128) may also include a network optimization engine (not shown) for optimizing, accelerating, or otherwise improving the performance, operation, or quality of any network traffic (or communications) traversing the network device (128).

In one or more embodiments, the network device (128) has one or more ports (e.g., port 443, port 1521, port 8881, etc.) for transmitting and receiving data packets over a secure tunnel (or over the network (105)). The ports may provide a physical and/or logical interface between network devices (for example, the network device (128) and a second network device) and the network (105) (or another computing device for transmitting and receiving network communications). In one or more embodiments, the type and form of a port may depend on (i) the type and form of the network (105) and (ii) the type of medium for connecting to the network (105).

As used herein, a "port" is a number representing communication endpoints in computer networking. A port is an unsigned 16-bit integer (0-65535) that identifies a specific process or a network service. In most cases, a port may employ a TCP or a user datagram protocol (UDP). The TCP enables two hosts to establish a connection and to exchange streams of data packets. The TCP also guarantees a delivery of data packets, in which the data packets will be delivered in the same order they were sent. Like the TCP, the UDP may be used in combination with IP and it facilitates a transmission of datagrams from one application to another application. However, unlike the TCP, the UDP does not guarantee a reliable communication. This means that it is up to the application (that received the message) to process any errors and verify the delivery.

In one or more embodiments, the network device (128) may be deployed based on (i) an "in-line of traffic" configuration or (ii) a "virtual in-line mode" configuration. In one or more embodiments, the network device (128) may be deployed in-line (or in parallel) to one or more of the following: a router, a security module, a server, or another network device. Further, the network device (128) may be deployed based on the virtual in-line mode configuration. In this configuration, a router (or a network device with routing or switching functionality) is configured to forward, re-route, or otherwise provide data packets (e.g., network packets) destined to the network device (128).

The network device (128) may then perform any desired processing on the data packets, such as any of WAN optimization techniques. Upon completion of processing, the network device (128) may forward the processed data packets to the router to transmit to the destination over the network (105). By this way, the network device (128) may be coupled to the router in parallel but still operate as it if the network device (128) were in-line. This deployment configuration may also provide transparency in the source and destination addresses, and port information are preserved as the data packets are processed and transmitted via the network device (128) through the network (105).

In one or more embodiments, the network device (128) may be implemented using any combination of wired and/or wireless network topologies. The network device (128) may employ any number and type of communications to enable, for example, the data center (120) and Client B (110B) to communicate with each other. Further, the network device (128) may be configured to perform all, or a portion, of the functionality described in FIGS. 3.1-3.3.

In one or more embodiments, the network device (128) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the network device (128) described throughout this application.

Alternatively, in one or more embodiments, similar to the data center (120), the network device (128) may also be implemented as a logical device.

In one or more embodiments, because the DCCs (described above and below) store and manage business-critical data and applications (e.g., services), data center security is one of the key aspects while designing a data center. To achieve this, as an additional, active, standby, and reliable security layer, the security module (124) may be deployed between (or disposed between) the firewall (122) and other components of the data center (120) so that, for example, (i) each component behind the security module (124) may remain intact, and (ii) business-critical data and services and their disaster recovery mechanisms may not directly exposed to the network (105) (because, in general, most of database applications and/or web services provided by a data center are directly exposed to a network with the protection of a single firewall layer, and in case of any attack or disaster, the data center may be vulnerable to direct attacks or impacts).

In one or more embodiments, the data center (120) may include one or more security modules (e.g., 124) that execute independently from the firewall (122) of the data center (120). In one or more embodiments, one instance of a security module (e.g., 124) may be deployed to each data center, for example, of an organization to enhance security and DCC monitoring.

In one or more embodiments, as being a lightweight multi-site application executing in each site of an organization, the organization may easily configure, deliver, and manage each security module (e.g., 124) across, for example, multiple cloud environments for high availability and reliability. Further, each security module (e.g., 124) may provide, for example (but not limited to): global load balancing, site failover, network traffic management across an organization's multiple data centers and public cloud provider networks, etc. In order to provide the aforementioned functionalities, each security module (e.g., 124) may (i) monitor the health, availability, and latency for each site, and (ii) perform one or more policies that have been configured around regulatory requirements.

In one or more embodiments, each security module (e.g., 124) may also, for example (but not limited to): ensure multi-site resiliency and disaster recovery (e.g., a security module (e.g., 124) may redirect network traffic to the closest or best performing data center, or to healthy data centers if there is an outage), improve data center performance and availability (for example, if network traffic is not distributed appropriately across data centers, one site might become oversubscribed while another is underutilized, and with its network traffic management functionality, a security module may ensure that the load is balanced more evenly across sites for an optimal user experience), improve scalability and agility of data centers, implement load balancing and reduce latency in data centers (by ensuring that no single data center is overloaded with too many valid requests), satisfy regulatory and security requirements (e.g., configuration parameters), etc.

One of ordinary skill will appreciate that the security module (124) may perform other functionalities without departing from the scope of the invention. In one or more embodiments, the security module (124) may be configured to perform all, or a portion, of the functionalities described in FIGS. 3.1-3.3. Additional details of the security module are described below in reference to FIG. 2.

In one or more embodiments, the security module (124) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the security module (124) described throughout this application.

Alternatively, in one or more embodiments, similar to the data center (120), the security module (124) may also be implemented as a logical device.

In one or more embodiments, the storage (130) is a specialized, high-speed network that provides high-performance and low-latency network access to storage devices (e.g., a networked storage solution). In one or more embodiments, the storage (130) may include, for example, one or more hosts (e.g., a storage area network (SAN) metadata server, a SAN data replication server, a SAN management server, etc.), one or more switches (e.g., a Fibre Channel (FC) switch, an Ethernet switch, an InfiniBand switch, etc.), one or more gateways (to move data between different storages), and one or more storage devices (e.g., redundant array of independent disks (RAID), a storage pool, a virtual storage resource for access by a remotely located computing device, etc.) that are interconnected using a variety of technologies, interfaces, topologies, and protocols (e.g., FC, Internet small computer systems interface (iSCSI), SCSI, nonvolatile memory express (NVMe), Fibre Connection (FICON), Fibre Channel over Ethernet (FCOE), remote direct memory access (RDMA), secure remote password (SRP), etc.).

In one or more embodiments, through different types of virtualization, the storage (130) may present storage devices to a host such that the storage devices appear to be locally attached. More specifically, storage traffic over, for example, FC avoids TCP/IP packetization and latency issues, as well as any LAN congestion, ensuring the highest simultaneous access speed available for media and mission critical stored data. Further, the storage (130) may be used to, for example (but not limited to): improve application (and/or data) availability (e.g., via multiple data paths, internal fallback (e.g., hardware redundancy) mechanisms, etc.), enhance application performance (e.g., via off-load storage functions, segregate networks, etc.), increase storage utilization and effectiveness (e.g., by consolidating storage resources, providing tiered storage, etc.), etc.

In one or more embodiments, a storage device (e.g., a device to store data and provide access to stored data) of the storage (130) may store unstructured and/or structured data that may include, for example (but not limited to): an identifier, an alias, a serial number, a vendor name or identifier, a model identifier, an identification of at least one capability, an identification of an available functionality, an identification of a resource provided by a storage device, a data center identifier, a storage device identifier, an access control list (ACL), a type of a data center, a size of a data center, an amount of space used in a data center, an amount of space available in a data center, information associated with redundancy features, a storage pool identifier, a parent storage pool identifier, a size of a storage pool, an amount of space used in a storage pool, an amount of space available in a storage pool, information associated with the types of provisioning functionality availability, default configuration data of a storage device, status data of a storage device, etc.

As used herein, a "switch fabric" is an interconnected network of switching devices that may include one or more input and output ports for communicating with a switch in a network of switching devices. As an interconnect architecture (e.g., a combination of hardware and software components), a switch fabric may (i) redirect data within a system (e.g., the storage (130)) from one of the ports in a line card to another port in a different line card and (ii) dynamically modify ACLs to include identifications of VMs, host computing devices, and/or network ports authorized to access a storage device. Further, a switch fabric may be a heterogeneous device, including switches that communicate based on the aforementioned protocols.

In one or more embodiments, the storage (130) may provide data protection (e.g., data backup, data replication, data management, data restore, etc.) services to the clients (e.g., 110A, 110B, etc.) (or any other component of the system (100)). The data protection services may initiate generation and storage of backups (e.g., block-based backups, file-based backups, etc.) in the storage (130). The data protection services may also include restoration of the clients (e.g., 110A, 110B, etc.) (or any other component of the system (100)) to a restoration host (not shown) using the backups stored (temporarily or permanently) in the storage (130).

More specifically, the storage (130) may provide data protection services to the clients (e.g., 110A, 110B, etc.) (or any other component of the system (100)) by orchestrating (or scheduling): (i) generation of backups of the clients (e.g., 110A, 110B, etc.), (ii) storage of the generated backups of the clients (e.g., 110A, 110B, etc.), (iii) consolidation of one or more backup requests to reduce (or to prevent) generation of backups that are not useful for restoration purposes, and (iv) restoration of the clients (e.g., 110A, 110B, etc.) to previous states using backups stored in the storage (130). Further, to provide the aforementioned services, the storage (130) may include functionality to generate and issue instructions to any other component of the system (100). The storage (130) may also generate instructions in response to data protection requests from other entities.

In one or more embodiments, the storage (130) may generate such instructions in accordance with data protection schedules that specify when a protection needs to be performed. In one or more embodiments, a data protection schedule may lay out specific points in time for a protection to be performed. A data protection schedule may be configured based on a user's RPO.

As used herein, a "user's RPO" is the time between a data loss event and a most recent backup. For example, if a user has a 4-hour RPO for an application, then the maximum gap between a data loss event and the most recent backup will be 4-hours. In most cases, having a 4-hour RPO may not necessarily mean that a corresponding user will lose 4 hours' worth of data. For example, consider a scenario in which a word processing application goes down at 12:35 a.m. and restored by 1:10 a.m. In this scenario, the user may not have much data to lose.

As yet another example, consider a scenario in which a security application goes down at 10:05 a.m. and could not be restored until 1:25 p.m. In this scenario, the user may lose data that is highly valuable to the user. For this reason, the user may set an RPO based on the application priority and may configure the backup schedules accordingly.

In one or more embodiments, while performing one or more operations requested by a user (or an administrator) of the data center (120), the storage (130) may include functionality to request and use resources (e.g., data, computing resources, etc.) available in the data center (120). Additional details of the resources (e.g., processing resources, networking resources, etc.) are described below. In one or more embodiments, the administrator may be a user with permission (e.g., a user that has root-level access) to make changes on the data center (120) that will affect other users of the data center (120).

In one or more embodiments, in order to provide the above-mentioned functionalities, the storage (130) may need to communicate with other components of the data center (120) with minimum amount of latency (e.g., with high-throughput (e.g., a high data transfer rate) and sub-millisecond latency). For this reason, REST APIs may be used to enable communication(s) between the storage (130) and the other components.

As used herein, a "REST API" is an interface that two computing devices use to exchange data securely over the Internet (or to exchange data internally). More specifically, the term "REST" defines a set of rules and constraints (not a protocol or a standard) that need to be followed when building a communication path(s). Any computing device that adheres to those rules and constraints will be able to communicate via a set of uniform, shared, and stateless (or stateful) operators and requests. APIs denote the underlying code that, if it conforms to the set of rules and constraints, allows computing devices to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate a computing device's connection (e.g., access) to one another. In general, the computing device performing the accessing is called "the client", and the computing device containing a resource is called "the server".

In operation, REST APIs use HTTP to communicate. More specifically, REST APIs communicate via HTTP to perform standard database functions such as, for example, creating, reading, updating, and deleting records within a resource. For example, a well-designed REST API is similar to a webpage executing on a web browser with built-in HTTP functionality. As used herein, "HTTP" is a request/response protocol that is used in cases in which a synchronous request/response is required. This means that computing devices making requests via REST APIs must be designed to expect an immediate response. If the client receiving the response is down, the sending service may be blocked while it awaits for the response. To prevent this, failover and error handling logic may be applied to (or built into) both applications.

In one or more embodiments, the storage (130) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the storage (130) described throughout this application.

Alternatively, in one or more embodiments, similar to the data center (120), the storage (130) may also be implemented as a logical device.

While the storage (130) has been illustrated and described as including a limited quantity and type of data, the storage (130) in accordance with embodiments of the invention may store additional, less, and/or different data without departing from the scope of the invention.

In one or more embodiments, as being a physical computing device or a logical computing device (e.g., a VM), a server of the servers (126) may be configured for, e.g.: (i) hosting and maintaining various workloads, (ii) providing a computing environment (e.g., computing power and storage) whereon workloads may be implemented, (iii) providing computer-implemented services (e.g., receiving a request, sending a response to the request, etc.) to one or more entities (e.g., users, components of the system (100), etc.), and (iv) exchanging data with other components registered in/to the network (105) in order to, for example, participate in a collaborative workload placement. In one or more embodiments, in order to read, write, or store data, a server may communicate with the storage (130) via an FC switch (described above), which is deployed between (or disposed between) the server and the storage (130).

For example, a server may split up a request with another component of the system (e.g., 100, FIG. 1), coordinating its efforts to complete the request (e.g., to generate a response) more efficiently than if the server had been responsible for completing the request. In one or more embodiments, a request may be, for example (but not limited to): a web browser search request, a representational state transfer (REST) request, a computing request, a database management request, a registration request, a file upload/download request, etc. To provide the computer-implemented services to the entities, the server (e.g., an enterprise server, a modular server, a blade server, a mainframe, a workstation computer, etc.) may perform computations locally and/or remotely. By doing so, the server may utilize different computing devices (e.g., 500, FIG. 5) that have different quantities of computing resources (e.g., processing cycles, memory, storage, etc.) to provide a consistent experience to the entities. In one or more embodiments, the server may be a heterogeneous set, including different types of hardware components and/or different types of OSs.

In one or more embodiments, the network (105) may represent a computing network configured for computing resource and/or messages exchange among registered computing hosts (e.g., the data center (120), Client B (110B), etc.). As discussed above, components of the system (100) may operatively connect to one another through the network (105) (e.g., a LAN, a WAN, a mobile network, a wireless LAN (WLAN), etc.). In one or more embodiments, the network (105) may be implemented using any combination of wired and/or wireless network topologies, and the network (105) may be operably connected to the Internet or other networks. Further, the network (105) may enable interactions between, for example, the data center (120) and Client A (110A) through any number and type of wired and/or wireless network protocols (e.g., TCP, UDP, Internet Protocol version 4 (IPv4), etc.). Further, the network (105) may be configured to perform all, or a portion, of the functionality described in FIGS. 3.1-3.3.

The network (105) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components (e.g., the network device (128)) in the network (105), and (iii) limiting communication(s) on a granular level (e.g., on a per-port level, on a per-sending device level, etc.).

In one or more embodiments, before communicating data over the network (105), the data may first be broken into smaller batches (e.g., data packets) so that larger size data can be communicated efficiently. For this reason, the network-enabled subcomponents may break data into data packets. The network-enabled subcomponents may then route each data packet in the network (105) to distribute network traffic uniformly.

In one or more embodiments, the network-enabled subcomponents may decide how real-time (e.g., on the order of milliseconds or less) network traffic and non-real-time network traffic should be managed in the network (105). In one or more embodiments, the real-time network traffic may be high priority (e.g., urgent, immediate, etc.) network traffic. For this reason, data packets of the real-time network traffic may need to be prioritized in the network (105). The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network (105). The non-real-time network traffic may include data packets related to, for example (but not limited to): File Transfer Protocol (FTP) for web publishing, email applications, etc.

In one or more embodiments, the clients (e.g., 110A, 110B, etc.) may be physical or logical computing devices configured for hosting one or more workloads and/or for providing computing environments whereon workloads may be implemented. The clients (e.g., 110A, 110B, etc.) may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more SLAs configured by users of the clients (e.g., 110A, 110B, etc.)). In one or more embodiments, the clients (e.g., 110A, 110B, etc.) may correspond to computing devices (located on the other side of the network (105)) that one or more users (discussed below) use to interact with one or more components of the system (100).

In one or more embodiments, the clients (e.g., 110A, 110B, etc.) may include any number of applications (and/or content accessible through the applications) that provide computer-implemented application services to the users. Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide the aforementioned application services, each application may host similar or different components. The components may be, for example (but not limited to): instances of databases, instances of email servers, etc. Applications may be executed on the clients (e.g., 110A, 110B, etc.) as instances of an application.

Further, applications may vary in different embodiments, but in certain embodiments, applications may be custom developed or commercial (e.g., off-the-shelf) applications that a user desires to execute in a client (e.g., 110A, 110B, etc.). In one or more embodiments, applications (e.g., a word processor, a media player, a web browser, a file viewer, an image editor, etc.) may be (i) designed and configured to perform one or more functions instantiated by a user and (ii) logical entities executed using computing resources of a client (e.g., 110A, 110B, etc.). For example, applications may be implemented as computer instructions, e.g., computer code, stored on persistent storage of a client (e.g., 110A, 110B, etc.) that when executed by the processor(s) of the client (e.g., 110A, 110B, etc.) cause the client (e.g., 110A, 110B, etc.) to provide the functionality of the applications described throughout the application.

In one or more embodiments, while performing, for example, one or more operations requested by a user, applications installed on a client (e.g., 110A, 110B, etc.) may include functionality to request and use physical and/or logical components of the client (e.g., 110A, 110B, etc.). Applications may also include functionality to use data stored in storage/memory resources of the client (e.g., 110A, 110B, etc.). The applications may perform other types of functionalities not listed above without departing from the scope of the invention. In one or more embodiments, while providing application services to a user, applications may store data that may be relevant to the user in storage/memory resources of a client (e.g., 110A, 110B, etc.).

In one or more embodiments, the clients (e.g., 110A, 110B, etc.) may issue requests to the data center (120) to receive responses and interact with various components of the data center (120). The clients (e.g., 110A, 110B, etc.) may also request data from and/or send data to the data center (120). Further, the clients (e.g., 110A, 110B, etc.) may initiate an application to execute on the data center (120) such that the application may (itself) gather, transmit, and/or otherwise manipulate data located in the data center (120), remote to the clients (e.g., 110A, 110B, etc.). In one or more embodiments, the clients (e.g., 110A, 110B, etc.) may share access to more than one data center and may similarly share any data located in those data centers.

In one or more embodiments, when a client (e.g., 110A, 110B, etc.) interacts with the data center (120), data that is relevant to the client (e.g., 110A, 110B, etc.) may be stored (temporarily or permanently) in that data center (120). For example, consider a scenario in which the storage (130) hosts a database utilized by the clients (e.g., 110A, 110B, etc.). In this scenario, the database may be a client database associated with users of the clients (e.g., 110A, 110B, etc.). When a new user is identified, the storage (130) may add information of the new user to the client database. By doing so, data that is relevant to the clients (e.g., 110A, 110B, etc.) may be stored in the storage (130). This may be done because an administrator of the storage (130) may desire access to the information of the new user at some point-in-time.

As yet another example, a client (e.g., 110A, 110B, etc.) may execute an application that interacts with an application database hosted by the data center (120). When an application upgrade is available to fix a critical software issue, the data center (120) may identify the client (e.g., 110A, 110B, etc.) that requires the application upgrade. The application database may then provide the application upgrade to the client (e.g., 110A, 110B, etc.). By doing so, the application executed by the client (e.g., 110A, 110B, etc.) may be kept up-to-date. As yet another example, a client (e.g., 110A, 110B, etc.) may send instructions to the data center (120) to configure one or more VMs hosted by the data center (120). In one or more embodiments, instructions may be, for example (but not limited to): instructions to configure a backup policy, instructions to take a snapshot of VM data, etc. The clients (e.g., 110A, 110B, etc.) may perform other types of functionalities not listed above without departing from the scope of the invention.

In one or more embodiments, the clients (e.g., 110A, 110B, etc.) may provide computer-implemented services to users (and/or other computing devices such as, other clients or other types of devices). The clients (e.g., 110A, 110B, etc.) may provide any number and any type of computer-implemented services (e.g., data storage services, electronic communication services, etc.). To provide computer-implemented services, each client (e.g., 110A, 110B, etc.) may include a collection of physical components (e.g., processing resources, storage/memory resources, networking resources, etc.) configured to perform operations of the client (e.g., 110A, 110B, etc.) and/or otherwise execute a collection of logical components (e.g., applications, virtualization resources, etc.) of the client (e.g., 110A, 110B, etc.).

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), an SSD, RAM, Flash memory, a tape drive, an FC-based storage device, a floppy disk, a diskette, a compact disc (CD), a digital versatile disc (DVD), a NVMe device, a NVMe over Fabrics (NVMe-oF) device, resistive RAM (ReRAM), persistent memory (PMEM), virtualized storage, virtualized memory, etc.

As used herein, "storage" refers to a hardware component that is used to store data in a client (e.g., 110A, 110B, etc.). Storage may be a physical computer-readable medium. In most cases, storage may be configured as a storage array (e.g., a network attached storage array), in which a storage array may refer to a collection of one or more physical storage devices. Each physical storage device may include non-transitory computer-readable storage media, in which the data may be stored in whole or in part, and temporarily or permanently.

As used herein, "memory" may be any hardware component that is used to store data in a client (e.g., 110A, 110B, etc.). The data stored may be accessed almost instantly (e.g., in milliseconds) regardless of where the data is stored in memory. The memory may provide the above-mentioned instant data access because the memory may be directly connected to a CPU on a wide and fast bus (e.g., a high-speed internal connection that transfers data among hardware components of a client (e.g., 110A, 110B, etc.)).

In one or more embodiments, a client (e.g., 110A, 110B, etc.) may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while applications provide computer-implemented services to the clients (e.g., 110A, 110B, etc.), the applications may store data that may be relevant to the clients (e.g., 110A, 110B, etc.) to the storage/memory resources. When the client-relevant data is stored, the client-relevant data may be subjected to loss, inaccessibility, or other undesirable characteristics based on the operation of the storage/memory resources.

To mitigate, limit, and/or prevent such undesirable characteristics, users of the clients (e.g., 110A, 110B, etc.) may enter into agreements (e.g., SLAs) with providers (e.g., vendors) of the storage/memory resources. These agreements may limit the potential exposure of client-relevant data to undesirable characteristics. These agreements may, for example, require duplication of client-relevant data to other locations so that if the storage/memory resources fail, another copy (or other data structure usable to recover the data on the storage/memory resources) of the client-relevant data may be obtained. These agreements may specify other types of activities to be performed with respect to the storage/memory resources without departing from the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface a client (e.g., 110A, 110B, etc.) with external entities (e.g., other clients, the data center (120) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., TCP, UDP, RDMA, IEEE 801.11, etc.) for the transmission and receipt of data.

In one or more embodiments, a networking resource may implement and/or support the above-mentioned protocols to enable the communication between the client (e.g., 110A, 110B, etc.) and external entities. For example, a networking resource may enable the client (e.g., 110A, 110B, etc.) to be operatively connected, via Ethernet, using a TCP protocol to form a "network fabric", and may enable the communication of data between the client (e.g., 110A, 110B, etc.) and the external entities. In one or more embodiments, each client (e.g., 110A, 110B, etc.) may be given a unique identifier (e.g., an IP address) to be used when utilizing the above-mentioned protocols.

Further, a networking resource, when using a certain protocol or a variant thereof, may support streamlined access to storage/memory media of other clients. For example, when utilizing RDMA to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component.

A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of a client (e.g., 110A, 110B, etc.). The VM (and applications hosted by the VM) may generate data (e.g., VM data) that is stored in the storage/memory resources of the client (e.g., 110A, 110B, etc.), in which the VM data may reflect a state of the VM. In one or more embodiments, the VM may provide services to users, and may host instances of databases, email servers, or other applications that are accessible to the users.

In one or more embodiments, a virtualization resource may include a hypervisor, in which the hypervisor may be configured to orchestrate an operation of a VM by allocating computing resources of a client (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the client (e.g., 110A, 110B, etc.) that when executed by processing resources of the client cause the client to provide the functionality of the hypervisor.

In one or more embodiments, a client (e.g., 110A, 110B, etc.) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client (e.g., 110A, 110B, etc.) described throughout this application.

Alternatively, in one or more embodiments, similar to the data center (120), the client (e.g., 110A, 110B, etc.) may also be implemented as a logical device.

In one or more embodiments, users may interact with (or operate) the clients (e.g., 110A, 110B, etc.) in order to perform work-related tasks (e.g., production workloads). In one or more embodiments, the accessibility of users to the clients (e.g., 110A, 110B, etc.) may depend on a regulation set by an administrator of the clients (e.g., 110A, 110B, etc.). To this end, each user may have a personalized user account that may, for example, grant access to certain data, applications, and computing resources of the clients (e.g., 110A, 110B, etc.). This may be realized by implementing the "virtualization" technology (discussed above).

In one or more embodiments, for example, a user may be automatically directed to a login screen of a client (e.g., 110A, 110B, etc.) when the user connected to that client (e.g., 110A, 110B, etc.). Once the login screen of the client (e.g., 110A, 110B, etc.) is displayed, the user may enter credentials (e.g., username, password, etc.) of the user on the login screen. The login screen may be a graphical user interface (GUI) generated by a visualization module (not shown) of the client (e.g., 110A, 110B, etc.). In one or more embodiments, the visualization module may be implemented in hardware (e.g., circuitry), software, or any combination thereof.

In one or more embodiments, the GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

Figure 2:
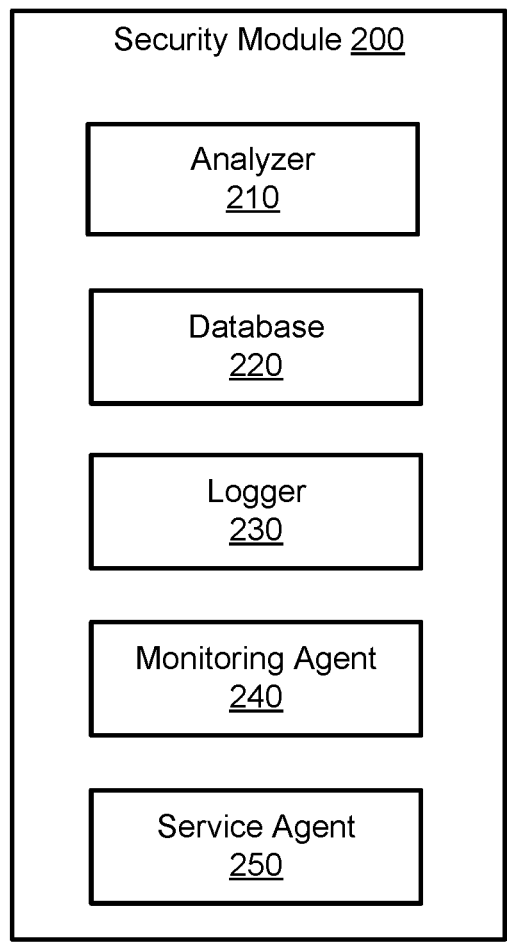
FIG. 2 shows a diagram of a security module in accordance with one or more embodiments of the invention.

Turning now to FIG. 2, FIG. 2 shows a diagram of a security module (200) in accordance with one or more embodiments of the invention. The security module (200) may be an example of the security module (124) discussed above in reference to FIG. 1. The security module (200) may include an analyzer (210), a database (220), a logger (230), a monitoring agent (240), a service agent (250), and an authentication agent (not shown). The security module (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the security module (200) may operate in a manner transparent (e.g., a transparent reverse proxy) to any DCC (e.g., a firewall (e.g., 122, FIG. 1), storage (e.g., 130, FIG. 1), etc.) of a data center (e.g., 120, FIG. 1) and any client (e.g., 110A, 110B, etc., FIG. 1) (or any user of that client) of that data center. In one or more embodiments, when any of the components of the security module (200) is down or unavailable to perform its functionalities, a second security module (deployed to the same data center) may continue to provide functionalities of the unavailable component.

In one or more embodiments, the analyzer (210) may include functionality to, e.g.: (i) intercept, identify, and accept/reject (in conjunction with the authentication agent) a request/call/network traffic (e.g., a data access request) received from an entity using an interception mechanism (i.e., the authentication agent), (ii) provide an additional layer of security/authentication mechanism (on top of a firewall) during any type communication/transaction/operation (e.g., a data retrieval operation from the storage (e.g., 130, FIG. 1) to a client (e.g., 110A, FIG. 1)) (a) for maximum data security, integrity, and availability, and (b) to prevent initiation of any invalid/bogus data replication/retrieval operation, (iii) obtain (or receive) an encrypted request and send that request to the corresponding target (e.g., a server of the servers (e.g., 126, FIG. 1)) over a network (e.g., 105, FIG. 1), (iv) based on (iii), send the encrypted request and its corresponding details (e.g., an IP address of a targeted destination and/or a port address of a target component (e.g., the server)), a client-side configuration associated with the request, information regarding data (e.g., type and/or content of data that is planned to be retrieved, a device/domain/unique identifier (IP address) of a user that wants to retrieve that data, etc.), API information of the request, a text length of the request, a request body of the request, etc.) to the logger (230), (v) intercept and identify (in conjunction with the authentication agent) a request/call (e.g., an encrypted request, a DNS request, an Internet control message protocol (ICMP) request, a network access request to initiate a hacking attack, a data access request, etc.) received from an entity (e.g., a valid/trusted client, a compromised user, an invalid user, a malicious insider, a credential/data thief, a negligent insider, etc.) based on a security protocol set by the related organization, (vi) based on (v) and the corresponding details of the request (which is decrypted and sent by the authentication agent post decryption), make a determination that the request is valid or not, (vii) based on the determination performed in (vi), reject the invalid request and send the rejected request (including its corresponding details) to the logger (230), (viii) based on the determination performed in (vi), accept the valid request and initiate generation of a secure data replication/retrieval path (e.g., a secure/encrypted, point-to-point tunnel) (described above in reference to FIG. 1) across (or overlay on) a network (e.g., 105, FIG. 1), (ix) based on the determination performed in (vi), initiate an operation (e.g., a data retrieval operation) that is defined in the intercepted request (described in (v)) by notifying the valid sender (i.e., the valid entity described in (v)) of that request, (x) receive, analyze, and verify outgoing network traffic (e.g., data packets or other communication protocol compliant data structures) from storage (e.g., the storage (e.g., 130, FIG. 1)) that is planned to be transmitted to a client (e.g., 110A, FIG. 1) via, for example, a secure data retrieval path (described in (viii)), (xi) based on (x), verify (and filter some of the outgoing network traffic if necessary) that the outgoing network traffic satisfies one or more attribution rules specified in the configuration parameters (e.g., verify the validity of the outgoing network traffic), (xii) based on the verification performed in (xi), initiate transmission of the outgoing network traffic to the target (e.g., Client A (e.g., 110A, FIG. 1)) using, for example, the secure data retrieval path, (xiii) send the details of the transmission operation to the logger (230), (xiv) notify an administrator of the data center (e.g., 120, FIG. 1) about the initiation of the secure, tamper-free, and efficient transmission operation (e.g., the data retrieval operation) using the data center's GUI (or using a visualization module (not shown) of the security module (200)), and (xv) as part of data management services provided by the data center (e.g., 120, FIG. 1), provide a secure method for storing and accessing data managed by the data center (e.g., 120, FIG. 1). Additional details of the analyzer are described below in reference to FIGS. 3.2 and 3.3.

As used herein, (i) a "malicious insider" is a user who intentionally hurt the organization, whether through data theft or by sabotage, (ii) a "negligent insider" is a user who unintentionally put the organization's security at risk, and (iii) a "credential/data thief" is an outside infiltrator who enters the organization through, for example, an employee account.

In one or more embodiments, as mentioned above, the analyzer (210) (*i*) may operate as a bi-directional proxy (e.g., a bi-directional proxy agent, an interceptor, etc.) (or may be configured to operate in both forward and reverse proxy modes) to intercept and scrutinize all incoming requests/calls/network traffic from the network (e.g., 105, FIG. 1) (that are allowed or not allowed (but bypassed) a firewall (e.g., 122, FIG. 1) (as the first layer of security)) towards the corresponding data center components (e.g., 130, FIG. 1) to prevent any malicious attacks (e.g., hacking/data hijacking attacks, DDOS attacks, etc.), and (ii) may operate in various different OS architectures based on OS wrapper packaging (e.g., Linux®, Docker®, Microsoft® Windows, etc.), or in any embedded OS, any network OS, any real-time OS, any open source OS, any OS for mobile computing devices, etc. As being a bi-directional proxy and an additional layer of security, the analyzer (210) may also monitor (and filter) all the outgoing responses/calls/network traffic and notify the logger (230) to log their details in the database (220). To enable these (and the aforementioned) functionalities of the analyzer (210), the security module (200) may be deployed in-line and between a firewall (e.g., 122, FIG. 1) and other components of a data center (e.g., 120, FIG. 1). In this manner, for example, (i) all network traffic may pass through the security module (200) before arriving at a destination within a data center (e.g., the analyzer (210) may manage all incoming requests from a client (e.g., 110A, FIG. 1), and direct the valid requests to one or more services provided by the corresponding DCC(s)), (ii) the analyzer (210) may forward, re-route, load-balance, or otherwise provide (in conjunction with the authentication agent) the received network communication (e.g., data packets) to the storage (e.g., 130, FIG. 1), (iii) the analyzer (210) may block (in conjunction with the authentication agent) an invalid request/call/network traffic (see Step 332 of FIG. 3.2), and (iv) the analyzer (210) may monitor, analyze, verify, and filter (if necessary) the outgoing network traffic (i.e., data packets or other communication protocol compliant data structures) that is requested to be transmitted to a valid client (e.g., 110A, FIG. 1) or to an invalid client (for example, a malware/DDOS bot (or, for example, a VM user) that is somehow located within the data center (e.g., 120, FIG. 1) may want to transfer mission critical data to an untrustworthy entity) over a network (e.g., 105, FIG. 1).

As used herein, a "reverse proxy" protects components (e.g., web servers) of a computing device (e.g., a data center) from various different attacks and typically be implemented to increase security, performance, and reliability of that computing device. In most cases, as being an application-level gateway, a reverse proxy may sit in front of a data center and intercept one or more requests sent by a client over a network. If the requests are valid, the reverse proxy may forward them to a corresponding component of the data center for processing, and may then intercept the responses for those requests before initiating the transmission of those responses to the client. In this manner, no client ever communicates directly with the components of the data center.

A reverse proxy may provide one or more functionalities, for example (but not limited to): load balancing (to distribute incoming network traffic evenly among different servers of a data center to prevent any single server from becoming overloaded), protection from attacks (e.g., with a reverse proxy in place, a service never needs to reveal the IP address of its server, which makes harder to perform a DDOS attack), global server load balancing, caching (e.g., for faster data center performance, a reverse proxy may cache (temporarily save) response data), encryption (e.g., a reverse proxy may be configured to decrypt all incoming requests and encrypt all outgoing responses, in order to free up some of the resources of a data center), etc.

As used herein, a "forward proxy" is a server that sits in front of a group of computing devices (e.g., DCCs in a data center). When a DCC makes a request to sites and services on the Internet, the forward proxy server may intercept that request and if the request is valid, the forward proxy may communicate with web servers on behalf of that DCC. A forward proxy may provide one or more functionalities, for example (but not limited to): to avoid state or institutional browsing restrictions, to block access to certain content, to protect identity of a DCC (and the user of that DCC), etc.

In one or more embodiments, the analyzer (210) may include any logic, business rule, function, and/or operation for optimizing, accelerating, or otherwise improving the performance, operation, and/or quality of service of outgoing network traffic or the delivery of data packets at the network (e.g., 105, FIG. 1) via a network device (e.g., 128, FIG. 1). In this manner, the analyzer (210) may (a) regulate (or manage) data transfer rates (e.g., data transfer via a high priority network slide that implements a high communication bandwidth network capacity, data transfer via a low priority network slice that implements a low communication bandwidth network capacity, etc.) and data receipt rates in conjunction with the network device (e.g., 128, FIG. 1), (b) coordinate with the network device (e.g., 128, FIG. 1) to manipulate, adjust, simulate, change, improve, or otherwise adapt the behavior of a predetermined data transfer protocol to improve performance of delivery, data rates and/or communication bandwidth utilization of the network (e.g., 105, FIG. 1), (c) implement (in conjunction with the network device (e.g., 128, FIG. 1)) a data transfer/flow control method, for example (but not limited to): a pre-acknowledgement method, a window virtualization method, a re-congestion method, a local re-transmission method, a wave-front detection and disambiguation method, a transaction boundary detection method, a re-packetization method, etc., (d) measure and monitor the performance of, for example, any VPN connections and/or sessions (e.g., an SSL VPN session) established by the network device (e.g., 128, FIG. 1), and (e) measure and monitor the performance of any acceleration technique performed by the network device (e.g., 128, FIG. 1), such as SSL offloading, load balancing and/or content switching, connection pooling and multiplexing, caching, and compression.

Further, to manage network communications performed by a network device (e.g., 128, FIG. 1), the analyzer (210) may configure that network device. For example, the analyzer (210) may disable/enable some of the ports of a network device (e.g., 128, FIG. 1) depending on a user level of a user (e.g., a high priority user, a low priority user, etc.) that requested a specific computer-implemented service. Thus, while the components of the corresponding data center (e.g., 120, FIG. 1) may be capable of performing any number of computer-implemented services, they may be limited in providing some of their services. In this manner, the analyzer (210) may prevent a low priority user from communicating with the corresponding component of the data center (e.g., 120, FIG. 1) using certain ports (which are assigned for providing the computer-implemented services to high priority users).

For example, consider a scenario in which Client B (e.g., 110B, FIG. 1) communicates with a server of the data center (e.g., 120, FIG. 1) for (i) graphics displaying services via a first port (of the network device (e.g., 128, FIG. 1)) and (ii) instant messaging services via a second port (of the network device (e.g., 128, FIG. 1)). Based on the intercepted communication(s), the analyzer (210) may (a) obtain information (e.g., credentials, identifiers, etc.) regarding the user (e.g., a low priority user) of Client B (e.g., 110B, FIG. 1) (who triggered the communication(s)), (b) based on (a), identify the services to be provided to that user (using the database (220)), and (c) configure the network device (e.g., 128, FIG. 1) to limit the network connectivity between the server and Client B (e.g., 110B, FIG. 1) in a manner that limits the ability of the server to only provide the identified services to that user. If the user is not to be provided with instant messaging services, the analyzer (210) may configure the network device (e.g., 128, FIG. 1) so that the communication (via the second port) between Client B (e.g., 110B, FIG. 1) and the server may be prevented. In order to prevent the communication, the network device (e.g., 128, FIG. 1) may drop the data packets (or other communication protocol compliant data structures) transmitted via the second port, thereby preventing the server from providing instant messaging services while still being able to provide graphics displaying services (e.g., because packets corresponding to these services are being transmitted via the first port, which is enabled).

One of ordinary skill will appreciate that the analyzer (210) may perform other functionalities without departing from the scope of the invention. When providing its functionalities, the analyzer (210) may perform all, or a portion, of the methods illustrated in FIGS. 3.2 and 3.3. The analyzer (210) may be implemented using hardware, software, or any combination thereof.

In one or more embodiments, the database (220) may be a fully managed, local, and lightweight database (or any logical container such as SQLite database) that acts as a shared storage or memory resource (discussed above) that is functional to store unstructured and/or structured data. Further, the database (220) may also occupy a portion of a physical storage/memory device or, alternatively, may span across multiple physical storage/memory devices.

In one or more embodiments, the database (220) may be implemented using physical devices that provide data storage services (e.g., storing data and providing copies of previously stored data). The devices that provide data storage services may include hardware devices and/or logical devices. For example, the database (220) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (220) may include a memory device (e.g., a dual in-line memory device), in which data is stored and from which copies of previously stored data are provided. As yet another example, the database (220) may include a persistent storage device (e.g., an SSD), in which data is stored and from which copies of previously stored data is provided. As yet another example, the database (220) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (220) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (220) may store (temporarily or permanently) unstructured and/or structured data that may include (or specify), for example (but not limited to): one or more configuration parameters (described below) provided/configured by an administrator of a data center, one or more lists that specify which computer-implemented services should be provided to which user (depending on a user access level of a user), one or more policies/rules for the operation (or configuration) of any portion of the analyzer (210) (to manage security, network traffic, network access, or any other function/operation performed by the analyzer (210)), one or more policies/rules for the operation (or configuration) of any portion of the monitoring agent (240), details of each data center of an organization (e.g., how many storage boxes deployed to each storage, information regarding the criticality of data stored in a storage box, an IP address of each component deployed to a data center, active/passive port numbers of each component deployed to a data center, a product identifier of each DCC deployed to a data center, applications/software executing on a data center, etc.) (either provided by an administrator of the data center directly or via IP range discovery (for example, the administrator may provide an IP range (e.g., 10.49.X.X or the full range such as 10.49.0.1-10.49.54) of the DCCs so that the monitoring agent (240) may identify the DCCs that needs to be monitored (based on identification and verification, the monitoring agent (240) may then store the details of each DCC in the database (220)))) to provide a complete data protection, integrity, and availability across those data centers, a profile of a valid user, a profile of an invalid user, one or more outputs of the processes performed by the analyzer (210), one or more outputs of the processes performed by the authentication agent, one or more outputs of the processes performed by the monitoring agent (240), a fraud report for an invalid user, a set of SLAs (e.g., an agreement that indicates a period of time required to retain a profile of a user), recently obtained user information (e.g., records, credentials, etc.) of a user, a port's user guide, a port's release note, a user posted approximated port activation time, a model name of a hardware component, application logs (described below), system logs (described below), DCC specific information (e.g., DCC events, periodically obtained temperature data/logs of a DCC, periodically obtained sensor data/logs of a DCC (any quantity and types of sensing measurements/data associated with the DCC over any period(s) of time and/or at any point(s) in time), etc.), details of a vendor (e.g., connection details (e.g., an IP address of an upload server) of a vendor to transfer/upload, for example, one or more logs and a failure report associated with a DCC), an alert (described below), temperature and/or other types of information indicative of the health of DCCs, a data protection policy (e.g., an SLA, an affinity-based backup policy, a data protection policy that dictates 30 days retention at storage, etc.) implemented by an administrator of a data center (for example, to protect the data center, to perform a rapid recovery, etc.), a configuration setting of that policy, a number of each type of a set of data protection policies implemented by an administrator of a data center, a utilization map that specifies resource utilization of a DCC (e.g., a quantity of utilization, resource utilization rates over time, power consumption of DCCs while utilized by clients, production workloads performed using DCCs for clients, etc.) per user session and/or per process, etc.

In one or more embodiments, as telemetry data, application logs may include (or specify), for example (but not limited to): application metadata (to determine properties of an application executing on a DCC), a size of an application (size (e.g., 5 Megabytes (5 MB), 5 GB, etc.) of an application may specify how much storage space is being consumed by that application), a type of an application (a type of an application may specify that, for example, the application is a support, deployment, or recycling application), a priority of an application (described below), a setting of a mission critical application (described below) executing on a DCC, a warning/an error (e.g., unknown software exception (0xc00d) occurred in the application at location 0x0007d)

occurred in an application, a version of an application, a version of an OS, a display resolution configuration of a client, a type of an OS (e.g., a workstation OS), an identifier of an OS (e.g., Microsoft® Windows), a product identifier of an application, active and inactive session counts, etc.

In one or more embodiments, a "setting of an application" may refer to a current setting that is being applied to an application either by a user or by default. A setting of an application may include, for example (but not limited to): a display option (e.g., a two-sided view) that is selected by a user, a font option that is selected by a user, an inbox folder setting of an electronic mail exchange application, a microphone setting of an application, a background setting of an application, etc.

In most cases, obtaining one or more settings of an application may be important, for example, for the corresponding vendor while searching for a proper solution (for a reported technical support issue (TSI) associated with a DCC) in its shared storage (not shown) (see Step 318 of FIG. 3.1). For example, consider a scenario where Application A needs to be upgraded from version 1.2 (v1.2) to v1.3 (as a solution to a TSI reported by the monitoring agent (240) in conjunction with the analyzer (210)). In order to find a suitable (e.g., a compliant) v1.3 application upgrade package for Application A in the shared storage, an agent of the shared storage may need to know application settings of Application A. Otherwise, Application A may be upgraded to a non-compliant v1.3 and after the upgrade, whenever a user needs to use Application A, the user may need to disable one of the application settings of Application A to be able to perform a specific task.

In one or more embodiments, a priority of an application may specify, for example, a priority class of that application. The priority class may be based on, for example (but not limited to): an application's tolerance for downtime, a size of an application, a relationship (e.g., a dependency) of an application to other applications, etc. In one or more embodiments, applications may be classified based on each application's tolerance for downtime. For example, based on the classification, an application may be assigned to one of three classes such as Class I, Class II, and Class III. Class I application may be an application that cannot tolerate downtime. Class II application may be an application that can tolerate a period of downtime (e.g., an hour or other period of time determined by an administrator or a user). Class III application may be an application that can tolerate any amount of downtime.

In one or more embodiments, as telemetry data, system logs (including event logs and important keywords) may specify (or include), for example (but not limited to): information related to a DCC's CPU usage, information related to a newly detected USB device, a DCC's system state (e.g., health state information of a DCC) (for example, health state information of a DCC may indicate whether, based on the aggregated health information, that the DCC is or is not in a compromised state (described below)), a transition from one DCC state to another DCC state (e.g., Server A fan failure→overheating of Server A's CPU, Server A fan failure→Server A's memory module failure, etc.), an important keyword related to a DCC (e.g., for Network Device B, the recommended maximum CPU operating temperature threshold is 45° C.), an amount of storage or memory (e.g., stack memory, heap memory, cache memory, etc.) used by an application, a language setting of an OS, a serial number of a DCC, a hardware identification (ID) number of a DCC, an identifier of a DCC's manufacturer, a product identifier of a DCC, a media access control (MAC) information of a DCC, a network connectivity information (e.g., a category of a network) of a DCC, a type of a DCC, a type of a file system (e.g., a new technology file system (NTFS), a resilient file system (ReFS), etc.), a certain file operation performed by a DCC, an amount of networking resource utilized by a DCC to perform a network operation (e.g., to publish and coordinate inter-process communications), an amount of bare metal communication executed by a DCC (e.g., input/output (I/O) operations executed by a DCC per second), a quantity of file descriptors (e.g., an unsigned integer that identifies an open file in an OS) utilized by a process that is executed by a DCC, a quantity of threads (e.g., a term indicating the quantity of operations that may be handled by a processor at once) utilized by a process that is executed by a DCC, operation errors detected for a DCC while generating a secure tunnel, computing resource utilization data (or key performance metrics including estimates, measurements, etc.) regarding the resources of a DCC, a job detail (e.g., how many data protection policies execute at the same time in a DCC; based on a configured data protection policy, how many assets are being backed up by a DCC; a type of a job, such as a data protection job, a data restoration job, a log retention job, etc.), a workflow (e.g., a policy that dictates how a workload should be configured and/or protected, such as an SQL workflow dictates how an SQL workload should be protected) set (by a user) for a DCC, network latency information related to a DCC, bandwidth utilization information of a DCC, performance of an HTTP-based transaction (including related requests and responses) performed by a DCC, performance of any acceleration method (e.g., SSL offloading, connection pooling and multiplexing, etc.) performed by a DCC, etc.

In one or more embodiments, a compromised health state (e.g., an unhealthy state) may indicate that the corresponding DCC has already or is likely to, in the future, be no longer able to provide the computing resources (or services) that it has previously provided. The health state determination may be made via any method based on the aggregated health information without departing from the scope of the invention.

In one or more embodiments, important keywords may be defined by a vendor of that client, by a vendor of the corresponding data center (e.g., 120, FIG. 1), by the administrator of that data center, by another entity, or any combination thereof. The important keywords may be specific technical terms or vendor specific terms that are used in system log files.

In one or more embodiments, as telemetry data, alerts may specify (or include), for example (but not limited to): for Server A, medium-level of CPU overheating is detected; for Network Device B, recommended maximum CPU operating temperature threshold is exceeded; an alert (e.g., a predictive alert, a proactive alert, a technical alert, etc.) triggered in a DCC, etc. In one or more embodiments, alerts may be defined by a vendor of the corresponding data center (e.g., 120, FIG. 1), by the administrator of that data center, by another entity, or any combination thereof. The alerts may be defined based on a data protection policy.

In one or more embodiments, the configuration parameters may specify (or include), for example (but not limited to): a request ruleset (for example, for the reverse proxy mode); a response ruleset (for example, for the forward proxy mode); one or more rules/policies for (a) what data to cache, (b) when to cache the data, (c) for whom to cache the data, and (d) when to expire an object in cache or refresh the cache; one or more rules/policies that are provided based on (i) a profile of a user, (ii) an identification of a client, (iii) a type of a network connection, (iv) a type of storage, (v) contents/payloads of network traffic; types of allowed web services for access (and/or perform production workloads) (e.g., video streaming application services, medical field related database services, etc.) and their corresponding details (e.g., identifiers of those services, IP addresses of computing devices that provide those services, etc.); types of loads expected from allowed web services; a DCC inventory for monitoring (generated either through IP range discovery or provided by an administrator of a data center), a hardware component trap destination configuration for each DCC (a "trap destination" indicates one or more destinations (typically, 10-15 destinations such as the monitoring agent (240)) for a DCC to report an issue/a trap (e.g., recommended maximum CPU operating temperature threshold is exceeded) occurred in a DCC, so that the corresponding destinations will only allow/process traps sent by validated DCCs (to prevent potential trap submission attacks initiated by a malware bot (to manipulate services provided by DCCs) located within the corresponding data center); a definition of a trap (e.g., for Server B, the recommended maximum CPU operating temperature threshold is 45° C.; for Network Device C, the recommended GPU operating temperature range is 10° C.-35° C., etc.) and a policy to process/handle that trap (for example, to make a decision as to whether a trap indicates a real issue occurred in a DCC or just provides information regarding services provided by that DCC); etc.

In one or more embodiments, traps may be set by a manufacturer of each DCC. Alternatively, the traps may also be set by an administrator of the data center (e.g., 120, FIG. 1).

In one or more embodiments, during the deployment of the security module (200), an administrator of the data center (e.g., 120, FIG. 1) may directly provide the configuration parameters (which may be configured directly), or the configuration parameters may be imported by the administrator in the form of, for example, an extensible markup language (XML) file or JavaScript object notation (JSON) file.

In one or more embodiments, a request ruleset (e.g., one or more rules/configurations that allow the analyzer (210) to act as an inbound/incoming network traffic filter, one or more reverse proxy parameters, etc.) may specify (or include), for example (but not limited to): a request decryption rule, a request authentication rule (which may be utilized by the authentication agent to validate a request), a rule regarding how the analyzer (210) should operate, a type of an allowable network communication/protocol between an entity and the components of a data center, a particular header that needs to be included in an intercepted request, a smart contract that defines under what conditions a request should be accepted (e.g., granted), a smart contract that defines under what conditions a data packet should be transferred to storage, one or more rules/policies for detecting and blocking illegitimate requests and application-based attacks, one or more rules/policies to protect components of a data center against various classes and types of Internet-based vulnerabilities (e.g., buffer overflow, common gateway interface (CGI)-Bin parameter manipulation, form/hidden filed manipulation, forceful browsing, cross-site scripting (XSS), command injection, error triggering sensitive information leak, back doors and debug options, platform or OS vulnerabilities, etc.), different request/call/incoming network traffic validation parameters (e.g., types of allowed calls, size of allowed network traffic, types of allowed protocols, etc.), etc.

In one or more embodiments, the authentication related rules (e.g., a request decryption rule) included in the request ruleset may be the same across all data centers of an organization to perform a uniform and successful authentication process.

In one or more embodiments, a response ruleset (e.g., one or more rules/configurations that allow the analyzer (210) to act as an outbound network traffic filter) may include (or specify), for example (but not limited to): an attribution rule (e.g., a type/format of an asset (e.g., a ".pdf" file, a ".doc" file, a ".jpeg" file, etc.), a size of an asset, a content of an asset (e.g., a legal document, an engineering design document, etc.), an identifier of an asset, a type of a workload (e.g., an SQL database, a NAS executing on-premises, a VM executing on a multi-cloud infrastructure, etc.), etc.), an asset sensitivity/criticality threshold that needs to be applied for all outgoing network traffic, a smart contract that defines under what conditions a user (of a DCC) may access to a website (for example, to enable user privacy and protection), a smart contract that defines under what conditions a user (of a DCC) may transfer data outside of a data center environment, etc.

In one or more embodiments, the authentication related rules included in the response ruleset may be the same across all data centers of an organization to perform a uniform and successful authentication process.

In one or more embodiments, the database (220) may provide an indexing service. More specifically, an agent of the database (220) may receive various data authentication related inputs directly from, for example, the analyzer (210). Upon receiving, the agent may analyze those inputs to generate an index(es) (e.g., a data authentication index(es)) for optimizing the performance of the database (220) by reducing a required amount of database access(es) when implementing a request (e.g., a data retrieval request). In this manner, requested data may be quickly located and accessed from the database (220) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

Further, in one or more embodiments, an index may include, for example (but not limited to): information about a valid user associated with a data retrieval operation or a data replication operation (e.g., a data backup operation, a data recovery operation, etc.), a keyword/tag extracted from a data retrieval operation that relates to a type of a data chunk, etc. The index(es) may also include other information that may be used to efficiently identify historical data retrieval operations. In one or more embodiments, the aforementioned data may be stored as "data retrieval operation metadata" in the database (220), in which the corresponding data may be retrieved from a storage box of the storage (e.g., 130, FIG. 1).

In one or more embodiments, the unstructured and/or structured data may be updated (automatically) by third party systems (e.g., platforms, marketplaces, etc.) (provided by vendors) or by administrators based on, for example, newer (e.g., updated) versions of configuration parameters being available. The unstructured and/or structured data may also be updated when, for example (but not limited to): a different type of attack is captured for data access, a new response ruleset is generated, a new request ruleset is generated, etc.

In one or more embodiments, the unstructured and/or structured data may be maintained by, for example, the analyzer (210) and monitoring agent (240). The analyzer (210) and monitoring agent (240) may add, remove, and/or modify those data in the database (220) to cause the information included in the database (220) to reflect the latest version of, for example, configuration parameters. The unstructured and/or structured data available in the database (220) may be implemented using, for example, lists, tables, unstructured data, structured data, etc. While described as being stored locally, the unstructured and/or structured data may be stored remotely, and may be distributed across any number of devices without departing from the scope of the invention.

While the database (220) has been illustrated and described as including a limited number and type of data, the database (220) may store additional, less, and/or different data without departing from the scope of the invention.

One of ordinary skill will appreciate that the database (220) may perform other functionalities without departing from the scope of the invention. When providing its functionalities, the database (220) may perform all, or a portion, of the methods illustrated in FIGS. 3.1-3.3. The database (220) may be implemented using hardware, software, or any combination thereof.

In one or more embodiments, the logger (230) may be a shared storage or memory resource (discussed above) that is functional to store unstructured and/or structured data. Further, the logger (230) may also occupy a portion of a physical storage/memory device or, alternatively, may span across multiple physical storage/memory devices.

In one or more embodiments, the logger (230) may be implemented using physical devices that provide data storage services. The devices that provide data storage services may include hardware devices and/or logical devices. For example, the logger (230) may include any quantity and/or combination of memory devices, long-term storage devices, other types of hardware devices that may provide short-term and/or long-term data storage services, and/or logical storage devices (e.g., virtual persistent storage/virtual volatile storage).

For example, the logger (230) may include a memory device (e.g., a dual in-line memory device), in which data is stored and from which copies of previously stored data are provided. As yet another example, the logger (230) may include a persistent storage device (e.g., an SSD), in which data is stored and from which copies of previously stored data is provided. As yet another example, the logger (230) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the logger (230) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates storage resources of the physical storage devices.

In one or more embodiments, the logger (230) may store/log/record (temporarily or permanently, in conjunction with the database (220), and based on the log level configuration set by an administrator of the data center (e.g., 120, FIG. 1)) unstructured and/or structured data that may include (or specify), for example (but not limited to): a valid (e.g., a granted) request and its corresponding details, an invalid (e.g., a rejected) request and its corresponding details, one or more details (e.g., content of the transmitted data packets, information regarding a targeted destination, etc.) of a recently initiated data retrieval/access operation, one or more details (e.g., content of the intercepted data packets, information regarding the sender (e.g., a malicious user, a high priority trusted user, a low priority trusted user, etc.), information regarding the size of intercepted data packets, etc.) of an incoming request/call/network traffic, one or more details (e.g., content of the outgoing data packets, information regarding a targeted destination, information regarding the size of outgoing data packets, etc.) of an outgoing request/call/network traffic, a mapping table that shows the mappings between an incoming request/call/network traffic and an outgoing request/call/network traffic, a data replication operation history documentation of a valid user, a data retrieval operation history documentation of a valid user, recently obtained user activity records, a cumulative history of user activity records obtained over a prolonged period of time, a cumulative history of network traffic logs obtained over a prolonged period of time, previously received malicious data access requests from an invalid user, previously received malicious data replication requests from an invalid user, previously received malicious data retrieval requests from an invalid user, backup history documentation of a workload, a documentation that indicates a set of jobs (e.g., a data replication job, a data retrieval job, etc.) that has been initiated, a documentation that indicates a status of a job (e.g., how many jobs are still active, how many jobs are completed, etc.), a cumulative history of initiated data replication operations (e.g., sessions) over a prolonged period of time, a cumulative history of initiated data restore operations over a prolonged period of time, a cumulative history of initiated data retrieval operations over a prolonged period of time, any changes to configuration parameters (as well as the relevant parties and information associated with such changes, in which the changes may be result of changes made by an administrator or via administrative systems), details of data objects that do not match the corresponding configuration parameters (in this manner, the logged details may be used to audit a user, incoming network traffic, and/or outgoing network traffic), a number of calls/requests/responses intercepted (or traversing) by the analyzer (210) over a prolonged period of time, one or more details of an initiated data transfer operation from the storage (e.g., 130, FIG. 1) to a client (e.g., 110A, 110B, etc., FIG. 1), etc. Based on the aforementioned data, for example, the analyzer (210) may perform user analytics to infer the profile of users communicating with the data center (e.g., 120, etc. FIG. 1).

In one or more embodiments, data logged by the logger (230) may be registered. That is, the data may be indexed or otherwise associated with registration records. A registration record may be a data structure that includes information that enables the logged data to be accessed. For example, a registration record may include an identifier associated with the data. A registration record may include different, additional, and/or less information for access the data without departing from the scope of the invention. When the logger (230) stores data in itself, the logger (230) may provide a corresponding registration record to the database (220). The database (220) may utilize the aforementioned registration record to notify other entities of the existence of the data and/or to facilitate access to the data in the future.

In one or more embodiments, the unstructured and/or structured data may be maintained by, for example, the analyzer (210). The analyzer (210) may add, remove, and/or modify those data in the logger (230) to cause the information included in the logger (230) to reflect the latest version of, for example, configuration parameters. The unstructured and/or structured data available in the logger (230) may be implemented using, for example, lists, tables, unstructured data, structured data, etc. While described as being stored locally, the unstructured and/or structured data may be stored remotely, and may be distributed across any number of devices without departing from the scope of the invention.

While the logger (230) has been illustrated and described as including a limited number and type of data, the logger (230) may store additional, less, and/or different data without departing from the scope of the invention.

One of ordinary skill will appreciate that the logger (230) may perform other functionalities without departing from the scope of the invention. When providing its functionalities, the logger (230) may perform all, or a portion, of the methods illustrated in FIGS. 3.2 and 3.3. The logger (230) may be implemented using hardware, software, or any combination thereof.

In one or more embodiments, the monitoring agent (240) may include functionality to, e.g.: (i) monitor performance of each DCC by measuring/obtaining/collecting (or receiving) metadata (e.g., telemetry metadata including application logs, system logs, one or more DCC related traps/events, one or more DCC related alerts, etc.) of DCCs of a data center via its log collector and listeners (e.g., simple network management protocol (SNMP) listeners (e.g., sensor-based listeners), REST listeners, XML listeners, etc.) on a predetermined frequency (or based upon detection of any type and form of an event, for example, upon detection of a request for a website or receipt of an HTTP response), (ii) based on a result of an IP range discovery process and the component details (e.g., product identifiers, active/passive port numbers, etc.) of each DCC, make a determination that a DCC is valid or not, (iii) convert obtained (or received) traps (e.g., machine understandable requests/data) into meaningful information to infer (a) a previous and current states of the corresponding DCC and (b) one or more events occurred in that DCC, (iv) analyze (or process), (a) by employing a set of linear, non-linear, and/or ML models, (b) based on (ii), and (c) based on a set of defined policies/predetermined parameters (e.g., Network Device B's CPU operating temperature is below the recommended maximum CPU operating temperature threshold→no need to report (or take action) this informational trap to the corresponding vendor, Server C's GPU operating temperature is above the recommended maximum GPU operating temperature threshold→generate a warning (or an error notification) and report this critical trap/event/warning to the corresponding vendor, etc.), obtained/tracked (or received) metadata to extract relevant data, (v) based on (iv), obtain a current state of the corresponding DCC, (vi) based on (v), infer a future state of the corresponding DCC (to build observability for the DCC in order to identify health of the DCC), (vii) by employing a set of linear, nonlinear, and/or ML models and based on (vi), obtain a confidence score of the inferred future state of the corresponding DCC, (viii) based on the confidence score of the inferred future state, make a determination that a predetermined maximum confidence score is exceeded or not (for example, to identify health of the corresponding DCC), (ix) based on (viii), automatically react and generate a failure report associated with the corresponding DCC including at least the current state, inferred future state, relevant data, trap information of the DCC, and predetermined maximum confidence score, and (x) based on (ix), provide the failure report (including the identified health of the corresponding DCC) to a vendor of the corresponding DCC to notify an administrator of the vendor (so that the vendor evaluates the aforementioned data and takes the appropriate action). Additional details of the monitoring agent are described below in reference to FIG. 3.1.

In one or more embodiments, the metadata may be obtained as they become available or by the log collector and/or listeners polling each DCC (by making an API call to each DCC) for new information. Based on receiving the API call from, for example, the log collector, each DCC may allow the log collector to obtain the information. The information may be obtained (or streamed) continuously (without affecting production workloads of each DCC), as they generated, or they may be obtained in batches, for example, in scenarios where (i) the monitoring agent (240) receives a health score calculation request (e.g., a health check request) for each DCC, (ii) another entity of the data center (e.g., 120, FIG. 1) accumulates the information and provides them to the monitoring agent (240) at fixed time intervals, or (iii) the entity stores that information in the storage (e.g., 130, FIG. 1) and notifies the monitoring agent (240) to access the information from the storage (e.g., 130, FIG. 1). In one or more embodiments, the information may be access-protected for the transmission from the monitoring agent (240) to the corresponding vendor, e.g., using encryption.

One of ordinary skill will appreciate that the monitoring agent (240) may perform other functionalities without departing from the scope of the invention. The monitoring agent (240) may be implemented using hardware, software, or any combination thereof.

In one or more embodiments, the service agent (250) may include functionality to manage one or more services provided by a component of the security module (200). For example, the service agent (250) may shut down (i) one or more services/functionalities (e.g., the logging service) provided by the logger (230) and/or (ii) one or more services/functionalities (e.g., the monitoring service) provided by the monitoring agent (240) if the analyzer (210) could not perform its main services/functionalities because of a recent surge in incoming network traffic (e.g., when there is an unusually high amount of activity in the incoming network traffic).

One of ordinary skill will appreciate that the service agent (250) may perform other functionalities without departing from the scope of the invention. The service agent (250) may be implemented using hardware, software, or any combination thereof.

In one or more embodiments, the authentication agent may include functionality to, e.g.: (i) encrypt (e.g., a way of translating data from plaintext (unencrypted) to ciphertext (encrypted), in which encrypted data may be accessed with an encryption key) one or more data chunks (received from the storage (e.g., 130, FIG. 1)) using an encryption model (e.g., an asymmetric encryption method, a symmetric encryption model, a 128-bit encryption model, etc.), (ii) based on (i), send the encrypted data chunks and their corresponding details (e.g., a size of each data chunk, a type of each data chunk, etc.) to the analyzer (210), (iii) decrypt (e.g., a way of translating data from ciphertext to plaintext, in which decrypted data may be accessed with a decryption key) a request/call/network traffic (e.g., an encrypted data retrieval request) intercepted by the analyzer (210), (iv) based on (iii) extract (by implementing any necessary process such as, for example, network address translation) and send the corresponding details (e.g., an IP address of the sender, a type of the request, etc.) of the decrypted (e.g., resolved) request to the analyzer (210), (v) decrypt a request/call/network traffic (e.g., a data package sent by a client (e.g., 110A, FIG. 1)) that is received over a secure tunnel or intercepted by the analyzer (210), and (vi) based on (v) extract (by implementing any necessary process) and send the corresponding details (e.g., the number of data packets, a size of each data packet, an IP address of the sender, etc.) of the decrypted data package to the analyzer (210).

One of ordinary skill will appreciate that the authentication agent may perform other functionalities without departing from the scope of the invention. When providing its functionalities, the authentication agent may perform all, or a portion, of the methods illustrated in FIGS. 3.2 and 3.3. The authentication agent may be implemented using hardware, software, or any combination thereof.

In one or more embodiments, the security module (200) may also include a visualization module. The visualization module may include functionality to, e.g.: (i) receive one or more details (described above) of a recently initiated data retrieval operation, and display the aforementioned content on its GUI (for example, to an administrator of the data center (e.g., 120, FIG. 1)), (ii) receive one or more details (described above) of a recently initiated data transfer operation, and display the aforementioned content on its GUI (for example, in a separate window(s) on its GUI), (iii) receive one or more details (described above) of an incoming request/call/network traffic, and display the aforementioned content on its GUI (for example, in a separate window(s) on its GUI), and (iv) receive one or more details (described above) of an outgoing request/call/network traffic, and display the aforementioned content on its GUI (for example, in a separate window(s) on its GUI). In one or more embodiments, the visualization module may concurrently display one or more separate windows on its GUI. Further, the visualization module may include functionality to generate visualizations of methods illustrated in FIGS. 3.1-3.3.

In one or more embodiments, for example, while displaying an incoming request/call/network traffic and/or an outgoing request/call/network traffic, the visualization module may represent: (i) a normal (e.g., a valid) incoming request/call/network traffic with green color tones and (ii) an abnormal (e.g., an invalid) incoming request/call/network traffic with red color tones.

One of ordinary skill will appreciate that the visualization module may perform other functionalities without departing from the scope of the invention. The visualization module may be implemented using hardware, software, or any combination thereof.

In one or more embodiments, the analyzer (210), database (220), logger (230), monitoring agent (240), service agent (250), authentication agent, and visualization module may be utilized in isolation and/or in combination to provide the above-discussed functionalities. These functionalities may be invoked using any communication model including, for example, message passing, state sharing, memory sharing, etc. By doing so, the security module (200) may address issues related to data security, integrity, and availability proactively.

FIGS. 3.1-3.3 show a method for monitoring health and security of DCCs in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed security module (e.g., 200, FIG. 2). Other components of the system (100) illustrated in FIG. 1 may also execute all or part of the method shown in FIG. 3.1 without departing from the scope of the invention.

In Step 300, upon receiving a health check request (e.g., a health state check request) for a DCC from a requesting entity (e.g., an administrator of the corresponding data center (e.g., 120, FIG. 1)), or to monitor service performance and resource utilization of the DCC (to ascertain whether the services provided using the DCC meet the expectations of a client), the security module (more specifically, e.g., the monitoring agent (e.g., 240, FIG. 2)) obtains/gathers (or receives) metadata (e.g., telemetry metadata such as application logs, systems logs, DCC related alerts, DCC related traps/events, other DCC specific information, etc.) of the DCC from the DCC, in which the metadata may indicate at least one state transition of the DCC (for example, the state transition (from a healthy state to an unhealthy state) of the DCC may specify: operational Server A→Server A fan failure→overheating of Server A's CPU). Details of the metadata are described above in reference to FIG. 2.

In one or more embodiments, the metadata may be obtained (e.g., may be dynamically fetched) as they become available (e.g., with no user manual intervention), or by the monitoring agent polling the corresponding DCC (by making schedule-driven/periodic API calls to the DCC without affecting its ongoing production workloads) for metadata. Based on receiving the API calls from the monitoring agent, the DCC may allow the monitoring agent to obtain the metadata.

In one or more embodiments, while monitoring, the monitoring agent may need to, for example (but not limited to): inventory one or more components of the DCC, obtain a type and a model of a component of the DCC, obtain a version of firmware or other code executing on the DCC, obtain information regarding a hardware component or a software component of the data center that may be allocated to the DCC, obtain information specifying the DCC's interaction with one another, etc.

In Step 302, based on the result of an IP range discovery process and the component details (e.g., product identifiers, active/passive port numbers, etc.) of the DCC (stored in the database (e.g., 220, FIG. 2)), the monitoring agent makes a first determination as to whether the DCC is valid. Accordingly, in one or more embodiments, if the result of the first determination is YES, the method proceeds to Step 304. If the result of the first determination is NO, the method alternatively ends.

In one or more embodiments, based on the first determination (as like a filtering mechanism to prevent potential metadata submission attacks initiated by a malware bot (to manipulate services provided by the DCC) located within the data center), the monitoring agent may infer (or identify) whether, for example (but not limited to): the DCC is being utilized by a valid/authorized user to access data within the data center, the metadata is obtained from a valid DCC, the metadata is obtained from an invalid DCC, the DCC is being utilized by an invalid/unauthorized user (or a malware bot) to access data within the data center and to disable the security module (by choking it with an excessive amount of metadata submission), etc.

Thereafter, as a result of the first determination being YES, the monitoring agent may store (temporarily or permanently) the metadata in the database ((a) to keep a record regarding how business operations are executing within the data center and (b) for future metadata analysis).

In Step 304, (a) as a result of the first determination in Step 302 being YES, (b) by employing a set of linear, non-linear, and/or ML models (e.g., a natural language processing (NLP) model), and (c) based on a set of defined policies/predetermined parameters (discussed above in reference to FIG. 2), the monitoring agent proactively analyzes (or processes) the metadata (obtained or received in Step 300) to extract relevant data (which includes, at least, application logs, system logs, and hardware component traps associated with the DCC). In one or more embodiments, based on the extracted data, the monitoring agent may infer (or obtain detailed information regarding), for example (but not limited to): how the DCC has been utilized by a valid user, how a data protection policy has been implemented by a valid user, derive one or more outputs with respect to usage of the DCC to assist a vendor of the DCC with respect to making better investment decision for long-term product development (rather than second-guessing), the operations performed and/or failures occurred in the DCC, one or more reasons of those failures (e.g., is it because CPU malfunctioning, is it because the database not accessible, etc.) for troubleshooting, how the operational state (e.g., the nominal state) of the DCC is transitioned into the overheating of DCC state, etc.

In one or more embodiments, in order to analyze the metadata, the monitoring agent may be trained using any form of training data (e.g., previously obtained application and system logs of the DCC). In order to train, the above-mentioned models and/or other known or later discovered models may be employed. Further, the monitoring agent may be updated periodically as there are improvements in the models and/or the models are trained using more appropriate training data. Thereafter, the monitoring agent may store the relevant data in the database (temporarily or permanently).

In Step 306, based on the relevant data (extracted in Step 304) and by employing a set of linear, non-linear, and/or ML models, the monitoring agent obtains a current state (e.g., healthy, unhealthy, overheating, critical, warning, normal, etc.) of the DCC. In one or more embodiments, the current state of the DCC may be a state in which a DCC failure was reported. In one or more embodiments, an unhealthy state (e.g., a compromised health state) may indicate that the DCC has already or is likely to, in the future, be no longer able to provide the computing resources (or services) that it has previously provided. The health state determination may be made via any method based on the aggregated health information without departing from the scope of the invention.

In Step 308, based on the current state (and previously obtained/observed states) of the DCC (obtained in Step 306) and by employing a set of linear, non-linear, and/or ML models, the monitoring agent infers a future state (e.g., a predicted normal state, a predicted failure state, etc.) of the DCC. In one or more embodiments, among a list of failure states, the predicted failure state may have the highest likelihood to become the predicted failure. For example, based on the aforementioned data and method (e.g., based on heuristic information regarding previously observed relationships between health information and future outcomes), the monitoring agent may infer the future state of the DCC as "overheating of DCC's GPU (operational DCC (previous state)→DCC fan failure (current state)→overheating of DCC's CPU (inferred future state)). The aforementioned example is not intended to limit the scope of the invention.

In Step 310, by employing a set of linear, non-linear, and/or ML models (e.g., a conformal prediction model), the migration agent obtains a confidence score (e.g., a prediction quality) of the inferred future state (in Step 308). For example, based on the inferred future state and by employing the conformal prediction model, "overheating of DCC's CPU" may be determined as the correct future state with 80% confidence score. The aforementioned example is not intended to limit the scope of the invention.

In Step 312, based on the obtained confidence score (in Step 310), the monitoring agent makes a second determination as to whether the predetermined maximum confidence score threshold is exceeded. Accordingly, in one or more embodiments, if the result of the second determination is YES, the method proceeds to Step 316. If the result of the second determination is NO, the method alternatively proceeds to Step 314.

In one or more embodiments, the monitoring agent may execute the second determination by comparing the confidence score of the predicted future state against the predetermined maximum confidence score threshold. For example, if the confidence score of the predicted future state is 75% and the predetermined maximum confidence score threshold is 70%, the monitoring agent may determine that the predetermined maximum confidence score threshold is exceeded.

In Step 314, as a result of the second determination in Step 312 being NO, the monitoring agent infers (or identifies) that the DCC is healthy (e.g., providing a consistent performance, generating a response to a request, its CPU is operating without exceeding a predetermined maximum resource utilization value threshold, its GPU operating temperature is below the recommended maximum GPU operating temperature threshold etc.).

In one or more embodiments, the monitoring agent may wait until the confidence score of the inferred (e.g., predicted) future state exceeds the predetermined maximum confidence score threshold. For example, if the confidence score of the predicted future state is 55% and the predetermined maximum confidence score threshold is 70%, the monitoring agent may wait until the confidence score of the predicted future state exceeds 70%. In one or more embodiments, for example, if the administrator (of the data center) does not want to take a risk of losing the data stored in the DCC, the administrator may set the predetermined maximum confidence score threshold to a lower level (e.g., 25%).

In Step 316, as a result of the second determination in Step 312 being YES, the monitoring agent infers (or identifies) that the DCC is unhealthy (e.g., slowing down in terms of performance, likely to fail, not generating a response to a request, over-provisioned, its CPU is exceeding the predetermined maximum resource utilization value threshold, its GPU operating temperature is above the recommended maximum GPU operating temperature threshold, etc.). For example, based on its health monitoring and determination (in Step 312), the monitoring agent may determine that the DCC is malfunctioning (e.g., is entered into a compromised state) or will be malfunctioning. Said another way, the monitoring agent may determine that an operational state of the DCC is not associated with the ability of the DCC to perform its functionalities.

To prevent (or remediate) that, the monitoring agent may provide a health management service (for the valid DCCs) and based on the policies directed by this service, the monitoring agent may automatically take a proactive (and preventive) action so that the DCC may transition from the compromised state back to a nominal state (e.g., a state in which the DCC providing computing resources (and/or services) that are not impaired).

For example, as an action, the monitoring agent may (i) generate one or more technical support issue (TSI) (an issue that prevents one or more functionalities of the DCC) alerts associated with the unhealthy DCC (because the predetermined maximum confidence score threshold is exceeded) and (ii) generate a failure report associated with the unhealthy DCC including, at least, the current state (obtained in Step 306), inferred future state (in Step 308), relevant data (extracted in Step 304), predetermined maximum confidence score threshold, TSI alerts, and user information of a user that was using the unhealthy DCC.

In one or more embodiments, a TSI alert may specify, for example (but not limited to): a maximum level of GPU overheating is detected, a recommended maximum GPU operating temperature is exceeded, etc. In one or more embodiments, the monitoring agent may then store (temporarily or permanently) the failure report in the database as "unhealthy DCC-related content".

In Step 318, the monitoring agent provides the failure report (generated in Step 316) to the vendor of the DCC (over a network (e.g., 105, FIG. 1)) to notify an administrator of the vendor about the unhealthy state of the DCC. In one or more embodiments, upon receiving the failure report of the DCC, in order to handle/manage the condition of the DCC, the administrator (of the vendor) may, e.g.: (i) perform one or more analyses to further infer (or process) the cause of the failure (in order to provide respective solutions to resolve the failure and improve the administrator's (of the data center) experience with the vendor), (ii) generate a technical support ticket (to notify a technical support person (TSP)) to manage/resolve the failure (and if necessary, the TSP may contact with the administrator of the data center to resolve the condition of the DCC), (iii) based on a TSP's recommendation, initiate dispatching/deploying of a healthy DCC to the data center (to replace the unhealthy DCC under a product warranty), (iv) based on a shared technical support database (managed by the vendor), infer what types of fixes need to be implemented on the unhealthy DCC to reinstate its nominal state for a better product management and development, (v) send a recommendation to the administrator of the data center to perform workload redistribution among DCCs (e.g., high performance load balancing) (a) to prevent workload mismatch between DCCs and (b) to manage the overall operation of the data center, (vi) send a recommendation to the administrator of the data center to reduce the quantity of unnecessary REST API calls that the DCC was responsible for (so that, for example, unnecessary memory utilization of the DCC may be prevented, (vii) send a recommendation to the administrator of the data center to modify resources allocated to the DCC (to ensure a highly available DCC), and (viii) send a recommendation to the administrator of the data center to modify the predetermined maximum resource utilization value threshold assigned to the DCC (so that the DCC may take more workloads without choking).

In one or more embodiments, the shared technical support database (e.g., a solution service) of the vendor may be a storage or memory resource that is functional to store unstructured and/or structured data. The unstructured and/or structured data may include, for example (but not limited to): an SLA, an existing knowledge base (KB) article, a TS history documentation of a DCC, recently obtained customer (e.g., an administrator of a data center) activity records, a cumulative history of customer activity records obtained over a prolonged period of time, a port's user guide, a port's release note, a community forum question and its associated answer, a user posted approximated port activation time, details of a remediative action that is applied to a previous hardware component failure, a version of a security fix, a version of an application upgrade, a model name of a hardware component, a catalog file of an application upgrade, details of a compatible OS version for an application upgrade to be installed, an application upgrade sequence, a solution or a workaround document for a software failure, a language setting of an OS, a serial number of a computing device, a hardware ID number of a hardware component, an identifier of a computing device's manufacturer, a product identifier of a hardware component, an identifier of a computing device, a setting of an application, a version of an application, a display resolution configuration required for an application, a product identifier of an application, etc.

In one or more embodiments, the unstructured and/or structured data may be updated (automatically) by third party systems based on, for example, newer (e.g., updated) versions of application upgrades being available. The unstructured and/or structured data may also be updated when, for example (but not limited to): a newer version of an existing KB article is published, a support ticket (e.g., a reported incident) is resolved, a comment is received for a support ticket, a TSI is resolved by a provided solution (e.g., by a recommended fix), a TS request is not resolved by a provided solution, etc.

In one or more embodiments, once the "unhealthy" state of the DCC is fixed (e.g., after the health of the DCC has been managed), the administrator (of the vendor) may notify, via the GUI of the visualization module, the administrator of the data center about the action that has been performed with respect to the DCC's state.

In one or more embodiments, the method may end following Step 318.

Turning now to FIG. 3.2, the method shown in FIG. 3.2 may be executed by, for example, the above-discussed security module. Other components of the system (100) illustrated in FIG. 1 may also execute all or part of the method shown in FIG. 3.2 without departing from the scope of the invention.

In Step 320, after the health of the DCC has been managed, the security module (more specifically, e.g., the analyzer (e.g., 210, FIG. 2)) intercepts a web service-related request from a client (e.g., 110A, 110B, etc., FIG. 1) that wants to use a web-based service provided by the DCC before it arrives its targeted destination. In one or more embodiments, after decrypting (if necessary) the intercepted request (in conjunction with the authentication agent), the analyzer may analyze (e.g., inspect, perform feature engineering based on a historical record under the provided/obtained IP address information, etc.)) the request (and its corresponding details) in accordance with rules/policies set by the administrator of the data center to extract useful information.

In one or more embodiments, useful information may include (or specify), for example (but not limited to): API information associated with the intercepted request, IP address information of the targeted destination (e.g., the DCC), a text length of the intercepted request, a body of the intercepted request, a header of the intercepted request, IP address information (e.g., identity) of an entity (e.g., a data consumer, a computing device, etc.) that sent the request, etc.

In one or more embodiments, during the analysis, if the historical record of the provided/obtained IP address information is empty, the intercepted request may be an abnormal request (e.g., no "encrypted request" detected) (or may be a normal request that is sent by another authorized user of the client). In one or more embodiments, the analyzer may then store (temporarily or permanently) a copy of the extracted information in the database.

In one or more embodiments, while the analyzer analyzes the intercepted request, the analyzer may concurrently continue to provide its services to the data center to provide maximum level data protection, integrity, and availability for the components (see FIG. 1) of the data center. For example, while analyzing an intercepted request/call/incoming network traffic, the analyzer may also intercept another request/call/incoming network traffic in parallel.

In Step 322, based on the configuration parameters (e.g., the request ruleset, described above in reference to FIG. 2), extracted information (in Step 320), and one or more different authentication mechanisms employed by the authentication agent (to authenticate different types of services), the analyzer makes a third determination as to whether the intercepted request (in Step 320) is valid. Accordingly, in one or more embodiments, if the result of the third determination is YES, the method proceeds to Step 324. If the result of the second determination is NO, the method alternatively proceeds to Step 332.

In Step 332, as a result of the second determination in Step 322 being NO, the analyzer tags the request as an invalid request (e.g., an abnormal request) and rejects (by taking a preventive/proactive policy action) the invalid request (so that (i) unauthorized entities cannot access to the business-critical data within the data center and (ii) a data access operation may not be initiated unless and until the analyzer validates the request). In one or more embodiments, the analyzer may then send a fake response (or a fake notification) to the malicious sender (e.g., the hacker) that initiated the invalid request.

In Step 334, the analyzer logs the rejected request (e.g., the request is related to a network attack initiated by a hacker) and its corresponding details in the database. In one or more embodiments, the analyzer may first send the rejected request and its corresponding details to the logger (e.g., 230, FIG. 2) of the security module (or the logger may obtained the aforementioned information). The logger may then log the aforementioned information in the database.

In one or more embodiments, the method may end following Step 334.

In Step 324, as a result of the second determination in Step 312 being YES, the analyzer tags the request as a valid request (e.g., the request sent by an authorized/trusted user, the request is an authentic request, etc.), logs the accepted/verified request and its corresponding details in the database. Thereafter, in conjunction with the authentication agent, the analyzer may identify the user (of the client) that triggered the web service-related request (intercepted in Step 320). In one or more embodiments, the authorization agent may identify the user via a login screen displayed to the user on a GUI of the client. Once the login screen is displayed, the user may enter information (e.g., username, password, etc.) on the GUI.

In Step 326, based on the entered information (in Step 324), the authentication agent may determine a user access level of the user.

In Step 328, as a validation step, the analyzer makes a fourth determination as to whether the user access level of the user (identified in Step 326) is greater than or equal to a predetermined user access level. Accordingly, in one or more embodiments, if the result of the fourth determination is YES, the method proceeds to Step 330. If the result of the fourth determination is NO, the method alternatively proceeds to Step 336.

In one or more embodiments, based on the identified user access level, the analyzer may infer (or identify) whether the user that initiated the request has the required credentials (e.g., a required level of user priority) and/or is authorized to access data within the data center. For example, a user with a user access level of 7/10 may access data (within the data center) that have an access level of 7/10 or lower. As yet another example, a user with a user access level of 6/10 may not access any data (within the data center) above an access level of 6/10.

In Step 336, as a result of the fourth determination in Step 328 being NO, the analyzer logs the corresponding details of the unauthorized user in the database. In one or more embodiments, the analyzer may first send the corresponding details to the logger (or the logger may obtained the aforementioned information). The logger may then log the aforementioned information in the database.

In one or more embodiments, the method may end following Step 336.

In Step 330, as a result of the fourth determination in Step 328 being YES, the analyzer sends/forwards the request (intercepted in Step 320) to the DCC. In one or more embodiments, the DCC may then process the request and generate a response (to that request).

Turning now to FIG. 3.3, the method shown in FIG. 3.3 may be executed by, for example, the above-discussed security module. Other components of the system (100) illustrated in FIG. 1 may also execute all or part of the method shown in FIG. 3.3 without departing from the scope of the invention.

In Step 338, the security module (more specifically, e.g., the analyzer) intercepts the response to the request (intercepted in Step 320 of FIG. 3.2) that is generated by the DCC before it arrives its targeted destination. In one or more embodiments, after decrypting (if necessary) the intercepted response (in conjunction with the authentication agent), the analyzer may analyze the response (and its corresponding details) in accordance with rules/policies set by the administrator of the data center to extract useful information.

In one or more embodiments, useful information may include (or specify), for example (but not limited to): API information associated with the intercepted response, IP address information of the targeted destination (e.g., the client), a text length of the intercepted response, a body of the intercepted response, content of the intercepted response, IP address information of an entity (e.g., the DCC) that sent the response, etc.

In one or more embodiments, during the analysis, if the historical record of the provided/obtained IP address information is empty, the intercepted response may be an abnormal response. In one or more embodiments, the analyzer may then store (temporarily or permanently) a copy of the extracted information in the database.

In Step 340, based on the extracted information (in Step 338), predetermined configuration parameters (e.g., one or more attribution rules), and corresponding details of the response, the analyzer verifies whether or not the response is a valid response and targeted to its destination (e.g., to the client). In one or more embodiments, based on the verification, the analyzer may filter (e.g., drop) some parts (e.g., some data packets) of the response that are planned to be transmitted to the client. Details of the attribution rules are described above in reference to FIG. 2.

In Step 342, based on the verification performed in Step 340, the analyzer initiates transmission of the response to the client (using, for example, a secure tunnel (described above in reference to FIG. 1). In one or more embodiments, if a retransmission of the response is required (when, for example, a receipt acknowledgement has not been received by the analyzer for the response after a predetermined period of time), the analyzer may reinitiate the transmission of the response. To this end, the analyzer may monitor acknowledgement(s) generated by the client so that the analyzer may determine whether the response has been successfully delivered (so that, for example, the data center's resources may become free to perform a subsequent process) or needs to be retransmitted.

In Step 344, the analyzer logs the details (e.g., number data packets that has been transmitted, total size of the data that has been transmitted, one or more details regarding the secure tunnel, etc.) of the transmission (along with the corresponding details of the request and authorized user) in its database. In one or more embodiments, the analyzer may first send the transmission details to the logger (or the logger may obtained the aforementioned information). The logger may then log the aforementioned information in the database.

In Step 346, in response to the initiation of the transmission (in Step 344), the analyzer notifies the administrator of the data center about the transmission using a GUI of the security module (which is included in a visualization module of the security module).

In one or more embodiments, the method may end following Step 346.

To further clarify embodiments of the invention, a non-limiting example use case is provided in FIGS. 4.1-4.4. These figures show diagrams of an example of system components similar to that of FIG. 1 over time.

Start of Example

The example use case, illustrated in FIGS. 4.1-4.4, is not intended to limit the scope of the embodiments disclosed herein and is independent from any other examples discussed in this application.

Turning to the example, consider a scenario in which three DCCs (e.g., DCC 1, DCC 2, and DCC 3) are deployed to an example data center (400). Initially, FIG. 4.1 shows a diagram of the example data center (400). For the sake of brevity, not all components of the example data center (400) may be illustrated in FIG. 4.1.

Assume here that: (i) a confidence score (e.g., a confidence level) of a predicted failure state of DCC 1 is 75% (underlined), (ii) a confidence level of a predicted failure state of DCC 2 is 15%, (iii) a confidence level of a predicted failure state of DCC 3 is 35%, and (iv) a predetermined maximum confidence level threshold is 70%.

At this time, all DCCs are directed (e.g., instructed) to provide services to corresponding valid users; however, upon making a determination that the confidence level of the predicted failure state of DCC 1 (75%) exceeds the predetermined maximum confidence level threshold (70%), the monitoring agent infers that DCC 1 will be malfunctioning (e.g., will be entered into a compromised state). Said another way, the monitoring agent infers that an operational state of DCC 1 is not associated with the ability of DCC 1 to perform its functionalities.

In order to prevent (or remediate) that, the monitoring agent automatically takes a proactive action and generates a failure report associated with DCC 1 including, at least, the current state of DCC 1, the inferred future state DCC 1, one or more logs, the predetermined maximum confidence score threshold, one or more associated TSI alerts, and user information of a user that was using DCC 1. The monitoring agent then provides the failure report to a vendor of DCC 1 to notify an administrator of the vendor about the condition of DCC 1 (so that DCC 1 transitions from the compromised state back to a nominal state (e.g., a state in which DCC 1 continues to provide its computer-implemented services)).

Turning now to example, FIG. 4.2 shows a diagram of the example data center (400) at a later point-in-time. Upon receiving the failure report from the monitoring agent and in order to handle/manage the condition of DCC 1, the administrator of the vendor initiates dispatching of a healthy DCC (DCC 1*) to the data center (to replace unhealthy DCC 1 under a product warranty). As indicated, after the deployment: (i) the issue related to DCC 1 is handled (where a confidence level of a predicted failure state of DCC 1* is 5% (underlined), (ii) the confidence level of the predicted failure state of DCC 2 is still 15%, and (iii) the confidence level of the predicted failure state of DCC 3 is still 35%.

At this time, all DCCs are directed to continue providing their corresponding computer-implemented services to the corresponding users.

Turning to the example, FIG. 4.3 shows a diagram of the example data center (400), an example network (404), and an example client (402) at yet a later point-in-time. For the sake of brevity, not all components of the example data center (400), example network (404), and example client (402) may be illustrated in FIG. 4.3.

After the health of DCC 1 has been managed, the analyzer intercepts a request (e.g., Request A) from the client (402) that wants to use a web-based service provided by DCC 1* before Request A arrives its targeted destination. Thereafter, after decrypting Request A (in conjunction with the authentication agent), the analyzer inspects Request A (and its corresponding details) in accordance with rules/policies set by the administrator of the data center (400). Based on the analysis, one or more configuration parameters, and one or more different authentication mechanisms employed by the authentication agent, the analyzer determines that Request A is valid. In conjunction with the authentication agent, the analyzer then identifies a user level of a user (of the client (402)) that triggered Request A. Assume here that the user level of the user is 7/10.

Thereafter, based on the identified user access level, the analyzer infers that the user access level of the user (7/10) is greater than a predetermined user access level (5/10), which indicates the user that triggered Request A has the required credentials and/or is authorized to access data within the data center (400). To this end, the analyzer forwards Request A to DCC 1*, in which DCC 1* processes Request A and generates a response (Response A) to Request A.

Turning to the example, FIG. 4.4 shows a diagram of the example data center (400), example network (404), and example client (402) at yet a later point-in-time. For the sake of brevity, not all components of the example data center (400), example network (404), and example client (402) may be illustrated in FIG. 4.4.

After Response A generated (by DCC 1*), the analyzer intercepts Response A before Response A arrives its targeted destination. Thereafter, after decrypting Response A (in conjunction with the authentication agent), the analyzer analyzes Response A (and its corresponding details) in accordance with rules/policies set by the administrator of the data center (400). Based on the analysis, configuration parameters (e.g., one or more attribution rules), and corresponding details of Response A, the analyzer verifies that Response A is a valid response and targeted to its destination (to the client (402)). Upon verification, the analyzer initiates transmission of Response A to the client (402).

End of Example

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a data center, the method comprising:
receiving metadata associated with a data center component (DCC);
in response to receiving the metadata, making a first determination that the DCC is valid;
analyzing, based on the first determination, the metadata to extract relevant data;
obtaining a confidence score of a future state of the DCC based on the relevant data;
making a second determination that the confidence score exceeds a predetermined maximum confidence score, wherein the second determination indicates that the DCC is unhealthy;
receiving, based on the second determination, a notification from a vendor of the DCC, wherein the notification indicates that health of the DCC has been managed;
making, after receiving the notification and after intercepting a request from a client, a third determination that the request is valid;
making, based on the third determination, a fourth determination that a user access level of a user of the client is greater than a predetermined user access level;
sending, based on the fourth determination, the request to the DCC;
verifying, after intercepting a response to the request, that the response satisfies an attribution rule specified in a configuration parameter and the response is targeted to the client;
initiating, based on the verification, transmission of the response to the client; and
notifying a second user of the data center about the transmission using a graphical user interface (GUI) of the data center.

2. The method of claim 1, further comprising:
obtaining a current state of the DCC based on the relevant data; and
inferring the future state of the DCC based on the current state of the DCC, wherein the DCC is one of a plurality of DCCs in the data center, and wherein the DCC is discovered among the plurality of DCCs by employing an Internet Protocol (IP) discovery model.

3. The method of claim 1, further comprising:
generating, based on the second determination, a failure report associated with the DCC, wherein the failure report comprises at least one selected from a group consisting of a current state of the DCC, the future state of the DCC, the relevant data, and the predetermined maximum confidence score; and
providing the failure report to the vendor of the DCC to notify an administrator of the vendor.

4. The method of claim 1, further comprising:
identifying, based on the third determination, the user access level of the user, wherein the user triggered generation of the request, and wherein the user access level of the user is used to identify a set of DCCs allowed to provide a computer-implemented service to the user.

5. The method of claim 1, wherein the relevant data specifies at least one selected from a group consisting of an application log, a system log, an alert, and a hardware component trap.

6. The method of claim 1, wherein the confidence score of the future state of the DCC is obtained using a conformal prediction model.

7. The method of claim 1, wherein the notification further indicates that the health of the DCC has been managed by replacing a hardware component of the DCC with a second hardware component.

8. The method of claim 1, wherein the notification further indicates that the health of the DCC has been managed by performing an application upgrade for an application executing on the DCC.

9. The method of claim 1, wherein the configuration parameter specifies at least a request ruleset and a response ruleset, wherein the second user sets the configuration parameter.

10. The method of claim 9, wherein the request ruleset specifies at least a request decryption rule and a request authentication rule to validate the request.

11. The method of claim 9, wherein the response ruleset specifies at least the attribution rule, wherein the attribution rule specifies at least one selected from a group consisting of a type of an asset, a size of an asset, a content of an asset, and an identifier of an asset.

12. A method for managing a data center, the method comprising:
    receiving metadata associated with a data center component (DCC);
    in response to receiving the metadata, making a first determination that the DCC is valid;
    analyzing, based on the first determination, the metadata to extract relevant data;
    obtaining a current state of the DCC based on the relevant data;
    inferring a future state of the DCC based on the current state of the DCC, wherein the DCC is one of a plurality of DCCs in the data center, and wherein the DCC is discovered among the plurality of DCCs by employing an Internet Protocol (IP) discovery model;
    obtaining a confidence score of the future state of the DCC based on the relevant data;
    making a second determination that the confidence score exceeds a predetermined maximum confidence score, wherein the second determination indicates that the DCC is unhealthy;
    generating, based on the second determination, a failure report associated with the DCC, wherein the failure report comprises at least one selected from a group consisting of the current state of the DCC, the future state of the DCC, the relevant data, and the predetermined maximum confidence score; and
    providing the failure report to a vendor of the DCC to notify an administrator of the vendor.

13. The method of claim 12, wherein the relevant data specifies at least one selected from a group consisting of an application log, a system log, an alert, and a hardware component trap.

14. The method of claim 12, wherein the confidence score of the future state of the DCC is obtained using a conformal prediction model.

15. The method of claim 12, wherein the notification further indicates that the health of the DCC has been managed by replacing a hardware component of the DCC with a second hardware component.

16. The method of claim 12, wherein the notification further indicates that the health of the DCC has been managed by performing an application upgrade for an application executing on the DCC.

17. A system comprising:
    a data center which comprises:
        a firewall;
        a server;
        a network device;
        a processor comprising circuitry;
        a storage device comprising instructions, wherein the server, the network device, the processor, and the storage device are other data center components (DCCs) of the data center; and
        a security module (SM), wherein the SM is deployed between the firewall and the other components of the data center, wherein when executed, the instructions perform a method, the method comprising:
            intercepting, by the SM, a request, wherein the request is sent by a client;
            making, by the SM, a determination that the request is valid;
            making, by the SM and based on the determination, a second determination that a user access level of a user of the client is greater than a predetermined user access level;
            sending, by the SM and based on the second determination, the request to a DCC;
            verifying, by the SM and after intercepting a response to the request, that the response satisfies an attribution rule specified in a configuration parameter and the response is targeted to the client;
            initiating, by the SM and based on the verification, transmission of the response to the client; and
            notifying, by the SM, a second user of the data center about the transmission using a graphical user interface (GUI) of the data center.

18. The system of claim 17, wherein the configuration parameter specifies at least a request ruleset and a response ruleset, wherein the second user sets the configuration parameter.

19. The system of claim 18, wherein the request ruleset specifies at least a request decryption rule and a request authentication rule to validate the request.

20. The system of claim 18, wherein the response ruleset specifies at least the attribution rule, wherein the attribution rule specifies at least one selected from a group consisting of a type of an asset, a size of an asset, a content of an asset, and an identifier of an asset.

* * * * *